(12) United States Patent
Zhao

(10) Patent No.: US 12,309,647 B2
(45) Date of Patent: May 20, 2025

(54) DATA EXCHANGE METHOD

(71) Applicant: HUAWEI TECHNOLOGIES CO., LTD., Shenzhen (CN)

(72) Inventor: Ying Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 537 days.

(21) Appl. No.: 17/584,539

(22) Filed: Jan. 26, 2022

(65) Prior Publication Data

US 2022/0150766 A1 May 12, 2022

Related U.S. Application Data

(63) Continuation of application No. PCT/CN2020/087682, filed on Apr. 29, 2020.

(30) Foreign Application Priority Data

Aug. 30, 2019 (CN) .......................... 201910817550.5

(51) Int. Cl.
*H04W 36/00* (2009.01)
*H04L 5/00* (2006.01)

(52) U.S. Cl.
CPC ....... *H04W 36/0058* (2018.08); *H04L 5/0051* (2013.01); *H04W 36/0044* (2013.01); *H04W 36/0061* (2013.01); *H04W 36/0085* (2018.08)

(58) Field of Classification Search
CPC ......... H04W 36/0058; H04W 36/0044; H04W 36/0061; H04W 36/0085; H04W 72/044;
(Continued)

(56) References Cited

U.S. PATENT DOCUMENTS

2014/0301271 A1* 10/2014 Xu ........................ H04J 11/0059
370/328
2018/0278313 A1   9/2018 Kim et al.
(Continued)

FOREIGN PATENT DOCUMENTS

CA     3073788 A1    4/2019
CN     102215182 A   10/2011
(Continued)

OTHER PUBLICATIONS

3GPP TS 36.211 V15.6.0 (Jun. 2019), "3rd Generation Partnership Project; Technical Specification Group Radio Access Network; Evolved Universal Terrestrial Radio Access (E-UTRA); Physical channels and modulation(Release 15)", 239 pages.
(Continued)

*Primary Examiner* — Chi H Pham
*Assistant Examiner* — Samuel Dilan Rutnam
(74) *Attorney, Agent, or Firm* — Maier & Maier, PLLC

(57) ABSTRACT

A data exchange method includes: receiving a first measurement report sent by user equipment UE, where the first measurement report includes a neighboring cell physical cell identifier PCI of an intra-frequency neighboring cell; determining, based on the neighboring cell PCI, configuration information corresponding to the intra-frequency neighboring cell, where the configuration information indicates a first time-frequency domain position of a resource element RE carrying a target signal; sending a first indication message to the UE based on the configuration information, where the first indication message is used to indicate the UE to set to skip, when receiving PDSCH data, performing data channel demodulation on the RE corresponding to the first time-frequency domain position; and setting, based on the configuration information, to forbid carrying, when delivering the physical layer downlink shared channel PDSCH data to
(Continued)

the UE, the PDSCH data on the RE corresponding to the first time-frequency domain position.

17 Claims, 12 Drawing Sheets

(58) Field of Classification Search
CPC . H04W 72/1273; H04W 72/21; H04W 72/23; H04W 72/542; H04L 5/0051; H04L 5/0091; H04L 5/0048; H04L 5/0094
See application file for complete search history.

(56) References Cited

U.S. PATENT DOCUMENTS

| | | | |
|---|---|---|---|
| 2019/0045559 A1 | 2/2019 | Huang et al. | |
| 2019/0098638 A1 | 3/2019 | Kakishima et al. | |

FOREIGN PATENT DOCUMENTS

| | | | | |
|---|---|---|---|---|
| CN | 102468922 | A | 5/2012 | |
| CN | 102754457 | A | 10/2012 | |
| CN | 102823167 | A | 12/2012 | |
| CN | 106549740 | A | 3/2017 | |
| CN | 109802818 | A | 5/2019 | |
| EP | 2608598 | A1 * | 6/2013 | ........... H04L 5/0048 |
| WO | WO-2011100520 | A1 * | 8/2011 | ........... H04L 5/0035 |
| WO | 2019061190 | A1 | 4/2019 | |
| WO | 2019062726 | A1 | 4/2019 | |

OTHER PUBLICATIONS

3GPP TS 36.331 V15.6.0 (Jun. 2019), "3rd Generation Partnership Project; Technical Specification Group Radio Access Network; Evolved Universal Terrestrial Radio Access (E-UTRA); Radio Resource Control (RRC); Protocol specification (Release 15)", 960 pages.

3GPP TS 36.213 V15.6.0 (Jun. 2019), "3rd Generation Partnership Project; Technical Specification Group Radio Access Network; Evolved Universal Terrestrial Radio Access (E-UTRA); Physical layer procedures(Release 15)", 551 pages.

3GPP TS 36.423 V15.6.0 (Jul. 2019), "3rd Generation Partnership Project; Technical Specification Group Radio Access Network; Evolved Universal Terrestrial Radio Access Network(E-UTRAN); X2 application protocol (X2AP)(Release 15)", 421 pages.

Huawei, HiSilicon, "Remaining Issues on Mobility Procedure"; 3GPP TSG RAN WG1 Meeting #95, Spokane, USA, Nov. 12-16, 2018, R1-1812180, 3 pages.

* cited by examiner

| CSI-RS subframe configuration $I_{CSI-RS}$ | CSI-RS periodicity (ms) $T_{CSI-RS}$ | CSI-RS subframe offset $\Delta_{CSI-RS}$ |
|---|---|---|
| 0 to 4 | 5 | $I_{CSI-RS}$ |
| 5 to 14 | 10 | $I_{CSI-RS} - 5$ |
| 15 to 34 | 20 | $I_{CSI-RS} - 15$ |
| 35 to 74 | 40 | $I_{CSI-RS} - 35$ |
| 75 to 154 | 80 | $I_{CSI-RS} - 75$ |

FIG. 5

| | CSI-RS configuration | Configured quantity of CSI reference signals | | | | | |
|---|---|---|---|---|---|---|---|
| | | 1 or 2 | | 4 | | 8 | |
| | | $(k, l)$ | $n_s$ mod 2 | $(k, l)$ | $n_s$ mod 2 | $(k, l)$ | $n_s$ mod 2 |
| Subframe structure type 1 or type 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Subframe structure type is only the type 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

FIG. 6

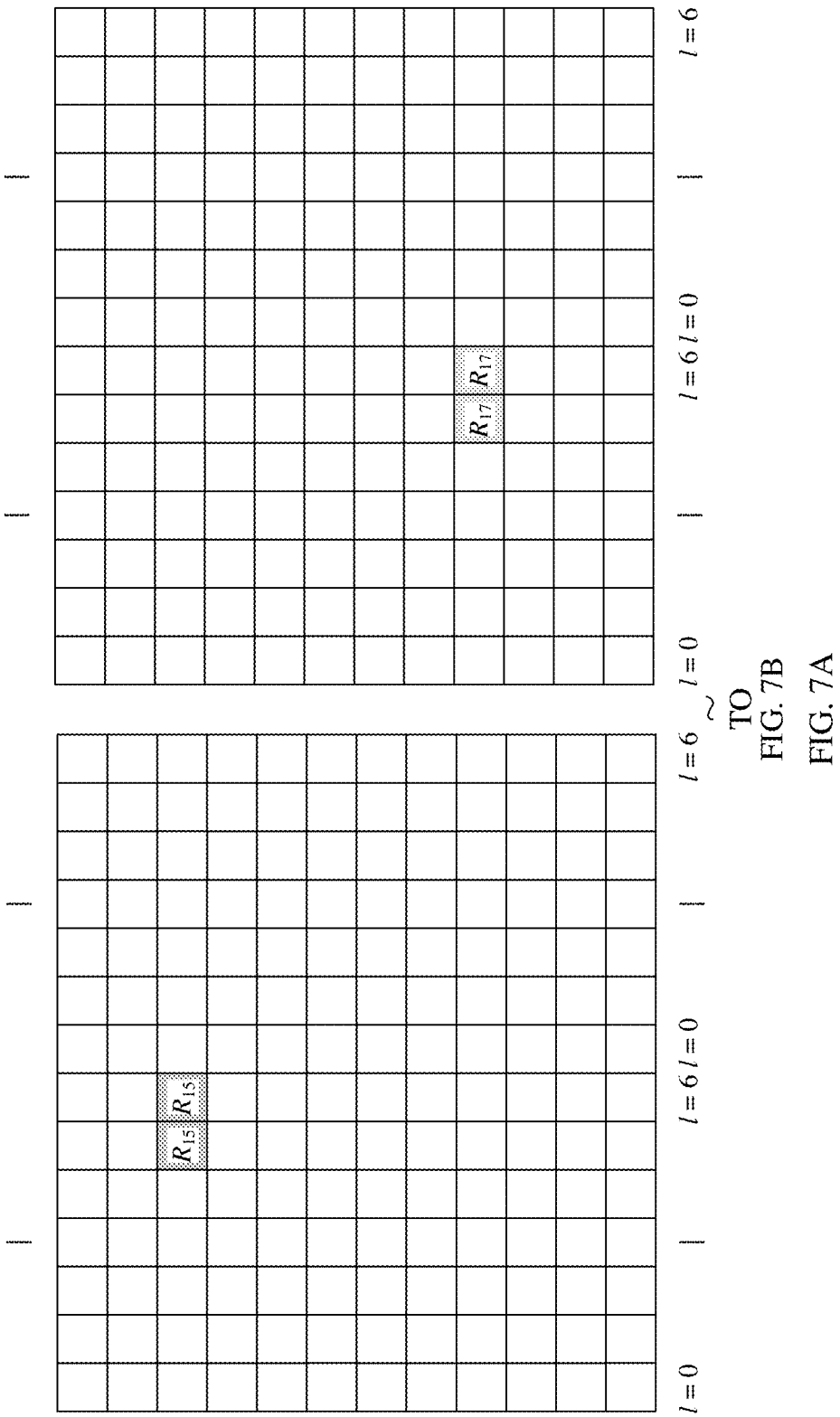

DATA EXCHANGE METHOD

CROSS-REFERENCE TO RELATED APPLICATIONS

This application is a continuation of International Application No. PCT/CN2020/087682, filed on Apr. 29, 2020, which claims priority to Chinese Patent Application No. 201910817550.5, filed on Aug. 30, 2019. The disclosures of the aforementioned applications are hereby incorporated by reference in their entireties.

FIELD

The embodiments relate to the communication field, and in particular, to a data exchange method, a first base station, and user equipment.

BACKGROUND

A downlink transmission mode TM9 is defined from 3rd generation partnership project (3GPP) Release 10. The TM9 transmission mode is different from a TM3/4 mode. In the TM9 mode, a channel state information reference signal (CSI-RS) is used as a downlink channel reference signal. After receiving a CSI-RS delivered by a base station to which a serving cell belongs, user equipment (UE) measures and feeds back information of a wireless channel such as a channel quality indicator (CQI), a rank (RI), and a precoding matrix indicator (PMI) to the base station to which the serving cell belongs.

Currently, when the UE is located in coverage of a plurality of cells, in addition to receiving a CSI-RS delivered in the serving cell, the UE further receives a CSI-RS delivered in a neighboring cell. When the neighboring cell is an intra-frequency neighboring cell of the serving cell, a time-frequency domain position of a resource element (RE) carrying the CSI-RS of the neighboring cell may overlap a time-frequency domain position of an RE that is sent in the serving cell to the UE and that carries physical layer downlink shared channel (PDSCH) data. That is, both power of the CSI-RS of the neighboring cell and power of the PDSCH data of the serving cell are on the REs whose time-frequency domain positions overlap. In this case, after receiving the PDSCH data, when the UE performs data channel demodulation to demodulate the RE at the time-frequency domain position, an error may occur during demodulation. As a result, an error occurs when the PDSCH data is demodulated.

SUMMARY

Embodiments provide a data exchange method, to reduce an error rate of parsing PDSCH data delivered by UE to a serving cell.

In view of this, according to a first aspect of the embodiments, a data exchange method is provided. The method may include the following steps.

When UE is located in an overlapping area of coverage of a serving cell and coverage of an intra-frequency neighboring cell, a first base station to which the serving cell belongs receives a first measurement report sent by the user equipment UE, where the first measurement report may include a neighboring cell physical cell identifier (PCI) of the intra-frequency neighboring cell. Then, the first base station determines, based on the neighboring cell PCI, configuration information corresponding to the intra-frequency neighboring cell, where the configuration information indicates a first time-frequency domain position of a resource element (resource element, RE) carrying a target signal, and the target signal is a downlink signal sent to the UE by a base station to which the intra-frequency neighboring cell belongs. The first base station sends a first indication message to the UE based on the configuration information, where the first indication message is used to indicate the UE to set to skip, when receiving the PDSCH data, performing data channel demodulation on the RE corresponding to the first time-frequency domain position. The first base station receives a first setting complete message sent by the UE, where the first setting complete message is sent by the UE after the UE determines that setting is completed. After receiving the first setting complete message, the first base station determines that the UE has completed setting. In this case, the first base station sets, based on the configuration information, to forbid carrying, when delivering the PDSCH data to the UE, the PDSCH data on the RE corresponding to the first time-frequency domain position.

In this embodiment, after receiving the first measurement report, the first base station determines, based on the neighboring cell PCI, the configuration information corresponding to the intra-frequency neighboring cell. The configuration information indicates the first time-frequency domain position of the RE carrying the target signal, and the target signal is the downlink signal delivered to the UE by the base station to which the intra-frequency neighboring cell belongs. Then, the first base station determines not to carry, when delivering the PDSCH data to the UE, the PDSCH data on the RE corresponding to the first time-frequency domain position, and notifies, by using the first indication message, the UE to skip, when receiving the PDSCH data, performing data channel demodulation on the RE corresponding to the first time-frequency domain position. In other words, data channel demodulation is performed when the RE that simultaneously carries the target signal of the intra-frequency neighboring cell and the PDSCH data of the serving cell and that corresponds to the first time-frequency domain position is skipped. When delivering the PDSCH data to the UE, the first base station skips the RE that simultaneously carries the target signal of the intra-frequency neighboring cell and the PDSCH data of the serving cell and that corresponds to the first time-frequency domain position. Therefore, when receiving the PDSCH data, the UE also skips performing data channel parsing on the RE, so that interference, caused by the target signal delivered in the intra-frequency neighboring cell, to the PDSCH data delivered in the serving cell is avoided, thereby improving a success rate of demodulating the PDSCH data by the UE.

In an embodiment, that the first base station determines, based on the neighboring cell PCI, configuration information corresponding to the intra-frequency neighboring cell may include: The first base station determines, based on the neighboring cell PCI, that the base station to which the intra-frequency neighboring cell belongs is the first base station; and determines, based on a preset correspondence between the neighboring cell PCI and the configuration information, the configuration information corresponding to the intra-frequency neighboring cell. In this embodiment, a description of determining the configuration information of the cell when the intra-frequency neighboring cell and the serving cell are cells under a same base station is provided.

In an embodiment, that the first base station determines, based on the neighboring cell PCI, configuration information corresponding to the intra-frequency neighboring cell may include: The first base station determines, based on the neighboring cell PCI, that the base station to which the intra-frequency neighboring cell belongs is a second base station; sends, to the second base station, an obtaining request for the configuration information; and receives the configuration information sent by the second base station. In this embodiment, a description of determining the configuration information of the cell when the intra-frequency neighboring cell and the serving cell are cells under different base stations is provided.

In an embodiment, the target signal is a channel state information reference signal CSI-RS, and the configuration information is CSI-RS configuration information. In this embodiment, an example is used for describing the target signal, where the target signal may be a CSI-RS, thereby improving feasibility of the solution.

In an embodiment, after the first base station determines, based on the neighboring cell PCI, the configuration information corresponding to the intra-frequency neighboring cell, and before the first base station sends the first indication message to the UE based on the configuration information, the method may further include: The first base station obtains zero-power CSI-RS configuration information based on the CSI-RS configuration information; and sets to include the zero-power CSI-RS configuration information in the first indication message, where the zero-power CSI-RS configuration information is used to indicate the UE to skip, when receiving the PDSCH data, performing data channel demodulation on the RE corresponding to the first time-frequency domain position. In this embodiment, a method of setting a status of the UE based on the first indication message when the target signal is a CSI-RS is described.

In an embodiment, after the first base station sets, based on the configuration information, to forbid carrying, when delivering the physical layer downlink shared channel PDSCH data to the UE, the PDSCH data on the RE corresponding to the first time-frequency domain position, the method may further include: The first base station receives a second measurement report sent by the UE, where the second measurement report does not carry the neighboring cell PCI; when the first base station determines that the second measurement report does not carry the neighboring cell PCI, the first base station sends a second indication message to the UE based on the configuration information, where the second indication message is used to indicate the UE to set to resume, when receiving the PDSCH data, performing data channel demodulation on the RE corresponding to the first time-frequency domain position; the first base station receives a second setting complete message sent by the UE, where the second setting complete message is sent by the UE after the UE determines that setting is completed; and the first base station sets, based on the configuration information, to resume carrying, when delivering the PDSCH data to the UE, the PDSCH data on the RE corresponding to the first time-frequency domain position. In this embodiment, a description of a method of resuming carrying the PDSCH data on the RE corresponding to first time-frequency domain and resuming performing demodulation on the RE corresponding to first time-frequency domain is provided, to help avoid a waste of PDSCH frequency-domain resources.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE. That the first base station sends a first indication message to the UE based on the configuration information may include: If the first base station determines that a difference that is between the first parameter and the second parameter and that may be included in the first measurement report is less than or equal to a preset threshold, the first base station sends the first indication message to the UE based on the configuration information. In this embodiment, a setting method in another scenario is provided. When determining that the signal strength of the intra-frequency cell is close to the signal strength of the serving cell, the first base station performs setting.

In an embodiment, after the first base station sets, based on the configuration information, to forbid carrying, when delivering the PDSCH data to the UE, the PDSCH data on the RE corresponding to the first time-frequency domain position, the method may further include: The first base station receives a second measurement report sent by the UE; when the first base station determines that the second measurement report may not include the second parameter, or that the difference that is between the first parameter and the second parameter and that may be included in the second measurement report is greater than the preset threshold, the first base station sends a second indication message to the UE based on the configuration information, where the second indication message is used to indicate the UE to resume, when receiving the PDSCH data, performing data channel demodulation on the RE corresponding to the first time-frequency domain position; the first base station receives a second setting complete message sent by the UE, where the second setting complete message is sent by the UE after the UE determines that setting is completed; and the first base station sets, based on the configuration information, to resume carrying, when delivering the PDSCH data to the UE, the PDSCH data on the RE corresponding to the first time-frequency domain position. In this embodiment, a description of another method of resuming carrying the PDSCH data on the RE corresponding to first time-frequency domain and resuming performing demodulation on the RE corresponding to first time-frequency domain is provided, to help avoid a waste of PDSCH frequency-domain resources.

In an embodiment, the first parameter is a first reference signal received power (reference signal received power, RSRP), and the second parameter is a second RSRP. In this embodiment, the first parameter and the second parameter are described by using examples, to improve operability of the solution.

According to a second aspect of the embodiments, a data exchange method is provided. The method may include the following steps.

When UE is located in an overlapping area of coverage of a serving cell and coverage of an intra-frequency neighboring cell, when a reporting condition is satisfied, the user equipment UE sends a first measurement report to a first base station, where the first measurement report may include a physical cell identifier PCI of the intra-frequency neighboring cell, the neighboring cell PCI is used to indicate the first base station to determine configuration information corresponding to the intra-frequency neighboring cell, the configuration information indicates a first time-frequency domain position of a resource element RE carrying a target signal, and the target signal is a downlink signal sent to the UE by a base station to which the intra-frequency neighboring cell belongs. Then, the UE receives a first indication message sent by the first base station based on the configuration information. The first indication message may carry information about the first time-frequency domain position.

The UE sets, based on the first indication message, to skip, after receiving physical layer downlink shared channel PDSCH data sent by the first base station, performing data channel demodulation on the RE corresponding to the first time-frequency domain position; and sends a first setting complete message to the first base station after determining that setting is completed.

In this embodiment, the UE reports the neighboring cell PCI of the intra-frequency neighboring cell, so that the first base station delivers the first indication message. Therefore, the UE sets, based on the first indication message, to skip, when receiving the PDSCH data, performing data channel demodulation on the RE corresponding to the first time-frequency domain position. This avoids an impact of the target signal of the intra-frequency neighboring cell on demodulating the PDSCH data by the UE, thereby increasing a success rate of demodulating the PDSCH data by the UE.

In an embodiment, the target signal is a channel state information reference signal CSI-RS, and the configuration information is CSI-RS configuration information. In this embodiment, an example is used for describing the target signal, where the target signal may be a CSI-RS, thereby improving feasibility of the solution.

In an embodiment, the first indication message may include zero-power CSI-RS configuration information, and the zero-power CSI-RS configuration information is obtained by the first base station based on the CSI-RS configuration information. That the UE sets, based on the first indication message, to skip, after receiving the PDSCH data sent by the first base station, performing data channel demodulation on the RE corresponding to the first time-frequency domain position includes: The UE sets, based on the zero-power CSI-RS configuration information, to skip, after receiving the PDSCH data sent by the first base station, performing data channel demodulation on the RE corresponding to the first time-frequency domain position. In this embodiment, a method of setting a status of the UE based on the first indication message when the target signal is a CSI-RS is described.

In an embodiment, after the UE sets, based on the first indication message, to skip, after receiving the physical layer downlink shared channel PDSCH data sent by the first base station, performing data channel demodulation on the RE corresponding to the first time-frequency domain position, the method may further include: The UE sends a second measurement report to the first base station, where the second measurement report may not include the neighboring cell PCI of the intra-frequency neighboring cell; the UE receives a second indication message sent by the first base station based on the configuration information, where the second indication message is sent by the first base station when the first base station determines that the second measurement report may not include the neighboring cell PCI of the intra-frequency neighboring cell; the UE sets, based on the second indication message, to resume, when receiving the PDSCH data, performing data channel demodulation on the RE corresponding to the first time-frequency domain position; and the UE sends a second setting complete message to the first base station after determining that setting is completed. In this embodiment, a description of a method of resuming performing demodulation on the RE corresponding to first time-frequency domain is provided, to help avoid a waste of PDSCH frequency-domain resources.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE. That the UE receives a first indication message sent by the first base station may include: The UE receives the first indication message sent by the first base station based on the configuration information, where the first indication message is sent by the first base station when the first base station determines that a difference between the first parameter and the second parameter is less than or equal to a preset threshold. In this embodiment, a setting method in another scenario is provided. When determining that the signal strength of the intra-frequency cell is close to the signal strength of the serving cell, the first base station performs setting.

In an embodiment, after the UE receives the first indication message sent by the first base station, the method may further include: The UE sends a second measurement report to the first base station; the UE receives a second indication message sent by the first base station, where the second indication message is sent by the first base station when the first base station determines that the second measurement report may not include the second parameter, or that the difference that is between the first parameter and the second parameter and that may be included in the second measurement report is greater than the preset threshold; the UE sets, based on the second indication message, to resume, when receiving the PDSCH data, performing data channel demodulation on the RE corresponding to the first time-frequency domain position; and the UE sends a second setting complete message to the first base station after determining that setting is completed. In this embodiment, a description of another method of resuming performing demodulation on the RE corresponding to first time-frequency domain is provided, to help avoid a waste of PDSCH frequency-domain resources.

In an embodiment, the first parameter is a first reference signal received power RSRP, and the second parameter is a second RSRP. In this embodiment, the first parameter and the second parameter are described by using examples, to improve operability of the solution.

According to a third aspect of the embodiments, a first base station is provided. The first base station may include:
  a receiver, configured to receive a first measurement report sent by user equipment UE, where the first measurement report may include a neighboring cell physical cell identifier PCI of an intra-frequency neighboring cell;
  a processor, configured to determine, based on the neighboring cell PCI, configuration information corresponding to the intra-frequency neighboring cell, where the configuration information indicates a first time-frequency domain position of a resource element RE carrying a target signal, and the target signal is a downlink signal sent to the UE by a base station to which the intra-frequency neighboring cell belongs; and
  a transmitter, configured to send a first indication message to the UE based on the configuration information, where the first indication message is used to indicate the UE to set to skip, when receiving PDSCH data, performing data channel demodulation on the RE corresponding to the first time-frequency domain position, where
  the receiver is further configured to receive a first setting complete message sent by the UE, where the first setting complete message is sent by the UE after the UE determines that setting is completed; and the processor is further configured to set, based on the configuration information, to forbid carrying, when delivering the physical layer downlink shared channel PDSCH data to the UE, the PDSCH data on the RE corresponding to the first time-frequency domain position.

In an embodiment, the processor is configured to:

determine, based on the neighboring cell PCI, that the base station to which the intra-frequency neighboring cell belongs is the first base station; and determine, based on a preset correspondence between the neighboring cell PCI and the configuration information, the configuration information corresponding to the intra-frequency neighboring cell.

In an embodiment:

the processor is configured to determine, based on the neighboring cell PCI, that the base station to which the intra-frequency neighboring cell belongs is a second base station;

the transmitter is further configured to send, to the second base station, an obtaining request for the configuration information; and the receiver is further configured to receive the configuration information sent by the second base station.

In an embodiment, the target signal is a channel state information reference signal CSI-RS, and the configuration information is CSI-RS configuration information.

In an embodiment:

the processor is further configured to obtain zero-power CSI-RS configuration information based on the CSI-RS configuration information; and set to include the zero-power CSI-RS configuration information in the first indication message, where the zero-power CSI-RS configuration information is used to indicate the UE to skip, when receiving the PDSCH data, performing data channel demodulation on the RE corresponding to the first time-frequency domain position.

In an embodiment:

the receiver is further configured to receive a second measurement report sent by the UE, where the second measurement report does not carry the neighboring cell PCI;

the transmitter is further configured to: when determining that the second measurement report does not carry the neighboring cell PCI, send a second indication message to the UE based on the configuration information, where the second indication message is used to indicate the UE to set to resume, when receiving the PDSCH data, performing data channel demodulation on the RE corresponding to the first time-frequency domain position, where the receiver is further configured to receive a second setting complete message sent by the UE, where the second setting complete message is sent by the UE after the UE determines that setting is completed; and the processor is further configured to set, based on the configuration information, to resume carrying, when delivering the PDSCH data to the UE, the PDSCH data on the RE corresponding to the first time-frequency domain position.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE; and the transmitter is configured to: if determining that a difference that is between the first parameter and the second parameter and that may be included in the first measurement report is less than or equal to a preset threshold, send a first indication message to the UE based on the configuration information.

In an embodiment:

the receiver is further configured to receive a second measurement report sent by the UE;

the transmitter is further configured to: when determining that the second measurement report may not include the second parameter, or the difference that is between the first parameter and the second parameter and that may be included in the second measurement report is greater than the preset threshold, send a second indication message to the UE based on the configuration information, where the second indication message is used to indicate the UE to resume, when receiving the PDSCH data, performing data channel demodulation on the RE corresponding to the first time-frequency domain position, where the receiver is further configured to receive a second setting complete message sent by the UE, where the second setting complete message is sent by the UE after the UE determines that setting is completed; and the processor is further configured to set, based on the configuration information, to resume carrying, when delivering the PDSCH data to the UE, the PDSCH data on the RE corresponding to the first time-frequency domain position.

In an embodiment, the first parameter is a first reference signal received power RSRP, and the second parameter is a second RSRP.

According to a fourth aspect of the embodiments, user equipment is provided. The user equipment may include:

a transmitter, configured to send a first measurement report to a first base station, where the first measurement report may include a physical cell identifier PCI of an intra-frequency neighboring cell, the neighboring cell PCI is used to indicate the first base station to determine configuration information corresponding to the intra-frequency neighboring cell, the configuration information indicates a first time-frequency domain position of a resource element RE carrying a target signal, and the target signal is a downlink signal sent to the UE by a base station to which the intra-frequency neighboring cell belongs;

a receiver, configured to receive a first indication message sent by the first base station based on the configuration information; and a processor, configured to set, based on the first indication message, to skip, after receiving physical layer downlink shared channel PDSCH data sent by the first base station, performing data channel demodulation on the RE corresponding to the first time-frequency domain position, where the transmitter is further configured to send a first setting complete message to the first base station after determining that setting is completed.

In an embodiment, the target signal is a channel state information reference signal CSI-RS, and the configuration information is CSI-RS configuration information.

In an embodiment, the first indication message may include zero-power CSI-RS configuration information, and the zero-power CSI-RS configuration information is obtained by the first base station based on the CSI-RS configuration information.

The processor is configured to set, based on the zero-power CSI-RS configuration information, to skip, after receiving the PDSCH data sent by the first base station, performing data channel demodulation on the RE corresponding to the first time-frequency domain position.

In an embodiment:
the transmitter is further configured to send a second measurement report to the first base station, where the second measurement report may not include the neighboring cell PCI of the intra-frequency neighboring cell;
the receiver is further configured to receive a second indication message sent by the first base station based on the configuration information, where the second indication message is sent by the first base station when the first base station determines that the second measurement report may not include the neighboring cell PCI of the intra-frequency neighboring cell; and
the processor is further configured to set, based on the second indication message, to resume, when receiving the PDSCH data, performing data channel demodulation on the RE corresponding to the first time-frequency domain position, where
the transmitter is further configured to send a second setting complete message to the first base station after determining that setting is completed.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE; and
the receiver is configured to receive the first indication message sent by the first base station based on the configuration information, where the first indication message is sent by the first base station when the first base station determines that a difference between the first parameter and the second parameter is less than or equal to a preset threshold.

In an embodiment:
the transmitter is further configured to send a second measurement report to the first base station;
the receiver is further configured to receive a second indication message sent by the first base station, where the second indication message is sent by the first base station when the first base station determines that the second measurement report may not include the second parameter, or that the difference that is between the first parameter and the second parameter and that may be included in the second measurement report is greater than the preset threshold; and
the processor is further configured to set, based on the second indication message, to resume, when receiving the PDSCH data, performing data channel demodulation on the RE corresponding to the first time-frequency domain position, where
the UE sends a second setting complete message to the first base station after determining that setting is completed.

In an embodiment, the first parameter is a first reference signal received power RSRP, and the second parameter is a second RSRP.

According to a fifth aspect of the embodiments, another first base station is provided. The first base station may include:
a processor, a memory, and a transceiver, where
the transceiver is configured to communicate with an apparatus other than the first base station;
the memory is configured to store instruction code; and
the processor is configured to execute the instruction code, to enable the first base station to perform the method according to any one of the first aspect or the embodiments of the first aspect.

According to a sixth aspect of the embodiments, other user equipment is provided. The user equipment may include:
a processor, a memory, and a transceiver, where
the transceiver is configured to communicate with an apparatus other than the user equipment;
the memory is configured to store instruction code; and
the processor is configured to execute the instruction code, to enable the user equipment to perform the method according to any one of the second aspect or the embodiments of the second aspect.

According to a seventh aspect of the embodiments, a computer storage medium is provided. The medium stores instructions, and when the instructions are run on a computer, the computer is enabled to perform the method according to any one of the first aspect or the embodiments of the first aspect.

According to an eighth aspect of the embodiments, a computer storage medium is provided. The medium stores instructions, and when the instructions are run on a computer, the computer is enabled to perform the method according to any one of the second aspect or the embodiments of the second aspect.

According to a ninth aspect of the embodiments, a computer program product is provided. The computer program product includes instructions, and when the instructions are run on a computer, the computer is enabled to perform the method according to any one of the first aspect or the embodiments of the first aspect.

According to a tenth aspect of the embodiments, a computer program product is provided. The computer program product includes instructions, and when the instructions are run on a computer, the computer is enabled to perform the method according to any one of the second aspect or the embodiments of the second aspect.

It can be learned from the foregoing solutions that the embodiments have the following advantages:

In this solution, when the UE is located in the overlapping area of the coverage of the serving cell and the coverage of the intra-frequency neighboring cell of the serving cell, the first measurement report reported to the first base station carries the neighboring cell PCI of the intra-frequency neighboring cell. After receiving the first measurement report, the first base station determines, based on the neighboring cell PCI, the configuration information corresponding to the intra-frequency neighboring cell. The configuration information indicates the first time-frequency domain position of the RE carrying the target signal, and the target signal is the downlink signal delivered to the UE by the base station to which the intra-frequency neighboring cell belongs. Then, the first base station determines not to carry, when delivering the PDSCH data to the UE, the PDSCH data on the RE corresponding to the first time-frequency domain position, and notifies, by using the first indication message, the UE to skip, when receiving the PDSCH data, performing data channel demodulation on the RE corresponding to the first time-frequency domain position. In other words, data channel demodulation is performed when the RE that simultaneously carries the target signal of the intra-frequency neighboring cell and the PDSCH data of the serving cell and that corresponds to the first time-frequency domain position is skipped. When delivering the PDSCH data to the UE, the first base station skips the RE that simultaneously carries the target signal of the intra-frequency neighboring cell and the PDSCH data of the serving cell and that corresponds to the first time-frequency domain position. Therefore, when receiving the PDSCH data, the UE also skips performing data channel parsing on the RE, so that interference, caused by the target signal delivered in the intra-frequency neighboring cell, to the PDSCH data delivered in the serving cell is avoided, thereby improving a success rate of demodulating the PDSCH data by the UE.

BRIEF DESCRIPTION OF DRAWINGS

FIG. 5 is a schematic diagram of a CSI-RS periodicity in a conventional technology;

FIG. 6 is a schematic diagram of CSI-RS configurations under different parameters in a conventional technology;

FIG. 7A and FIG. 7B are schematic diagrams of frequency domain positions of different CSI-RSs on different antenna ports;

DETAILED DESCRIPTION OF THE EMBODIMENTS

Figure 1:
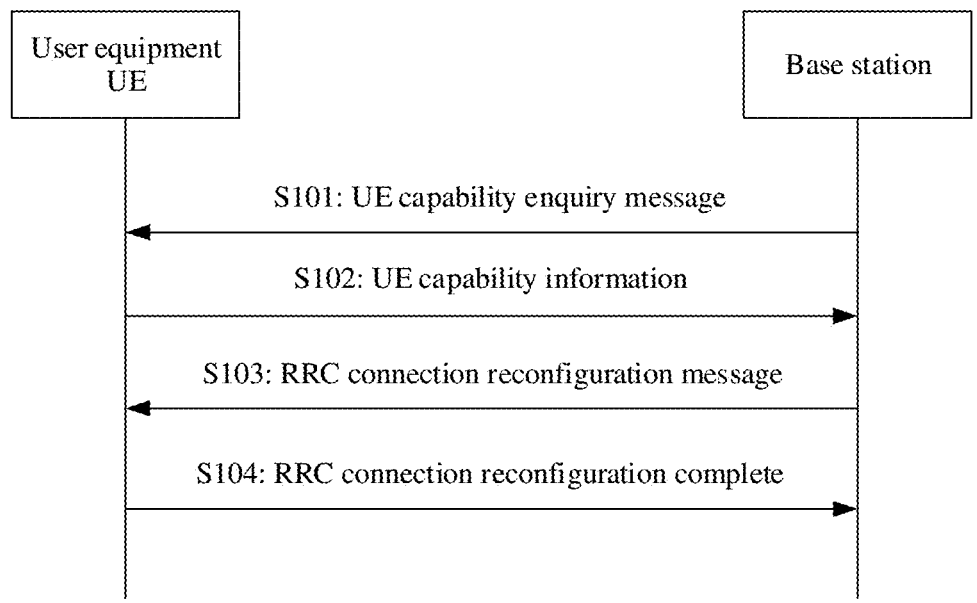
FIG. 1 is a schematic flowchart of configuring a CSI-RS and a TM9 mode for UE in a conventional technology.

Embodiments may be applied to a plurality of types of wireless communication systems. The wireless communication system generally includes a cell to which a base station (BS) belongs. Each base station includes one or more cells and provides a communication service for a plurality of UEs within coverage of each cell. A cell that provides the communication service for the UE is referred to as a serving cell, and a cell bordering the serving cell is referred to as a neighboring cell. When the UE is located in an overlapping area of coverage of the serving cell and coverage of the neighboring cell, the UE may simultaneously receive downlink data delivered in the serving cell and downlink data delivered in the neighboring cell. The neighboring cell and the serving cell may belong to a same base station or may belong to different base stations. The neighboring cell of the serving cell may be classified into an intra-frequency neighboring cell and an inter-frequency neighboring cell. The intra-frequency neighboring cell is a neighboring cell whose frequency is the same as that of the serving cell, and the inter-frequency neighboring cell is a neighboring cell whose frequency is different from that of the serving cell.

The wireless communication system mentioned in the embodiments includes but is not limited to a narrowband Internet of Things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division synchronous code division multiple access (TD-SCDMA) system, a long term evolution (LTE) system, an NR system, and a future mobile communication system.

In the embodiments, the described base station is an apparatus deployed in a radio access network to provide a wireless communication function for user equipment, and may include a macro base station, a micro base station (which is also referred to as a small cell), a relay station, an access point, a transmit and receive point (TRP) in a 5G system, or the like in various forms. In systems that use different radio access technologies, names of a device that has a base station function may be different. For example, in an LTE system, the device is referred to as an evolved NodeB (eNB), and in a 3rd generation (3G) system, the device is referred to as a NodeB (NB), or the like.

The UE (namely, a terminal) may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone), or a computer having a wireless transceiver function, for example, may be a portable, pocket-sized, handheld, computer built-in, or vehicle-mounted mobile apparatus. For example, the wireless terminal may alternatively be a device such as a personal communications service (PCS) phone, a cordless telephone set, a session initiation protocol (SIP) phone, a wireless local loop (WLL) station, or a personal digital assistant (PDA). The user equipment in the embodiments may also be referred to as a subscriber unit or a subscriber station, a mobile station, a mobile station, a remote station, a remote terminal, an access terminal, a user terminal, a user agent, a user device, or the like.

In a conventional technology, for a process of setting a CSI-RS mode for the UE, refer to FIG. 1. FIG. 1 is a schematic flowchart of configuring a CSI-RS and a TM9 in a conventional technology. As shown in FIG. 1, after UE accesses a base station, the base station performs step S101: sending, to the UE, a UE capability enquiry message used to obtain an air interface radio capability of the UE, to determine whether the UE supports a TM9 and a CSI-RS. After receiving the UE capability enquiry message, the UE performs step S102: reporting the air interface radio capability (UE capability information) of the UE to the base station. When determining that the air interface radio capability of the UE supports the TM9 and the CSI-RS, the base station performs step S103: sending an RRC connection reconfiguration message to the UE, where the RRC connection reconfiguration message may include CSI-RS configuration information and zero-power (ZP) CSI-RS configuration information of a serving cell in which the UE is located, and the CSI-RS configuration information and the zero-power CSI-RS configuration information are respectively used to configure a CSI-RS and a zero-power CSI-RS for the UE. The CSI-RS configuration information is used to notify the UE of a time-frequency domain position of an RE that carries the CSI-RS of the serving cell, so that the UE may determine, based on the CSI-RS configuration information, the CSI-RS from data transmitted with a PDSCH. Therefore, related measurement reporting is performed based on the CSI-RS. The zero-power CSI-RS configuration information also includes information about the time-frequency domain position of the RE. It is stipulated in a protocol that the base station does not transmit power on the RE corresponding to the time-frequency domain position in the zero-power CSI-RS configuration information. After the base station sends the zero-power CSI-RS configuration information to the UE, when the UE receives PDSCH data, the UE skips performing data channel demodulation on the RE corresponding to the time-frequency domain position in the zero-power CSI-RS configuration information. After receiving the RRC reconfiguration message, the UE separately performs air interface reconfiguration based on the CSI-RS configuration information and the zero-power CSI-RS configuration information, and performs, after the configuration is completed, step S104: sending an RRC connection reconfiguration complete message to the base station, to complete an air interface reconfiguration process.

Figure 2:
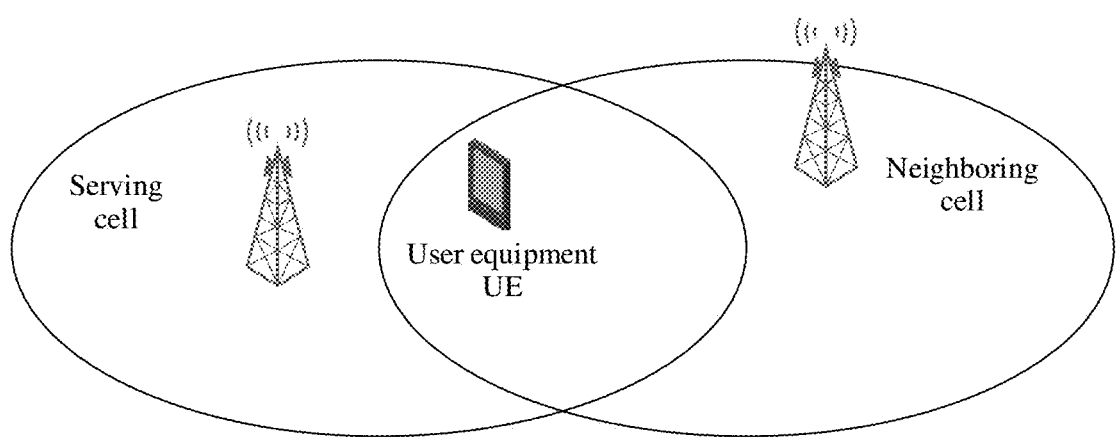
FIG. 2 is a schematic diagram of an application scenario according to an embodiment.
Figure 3:
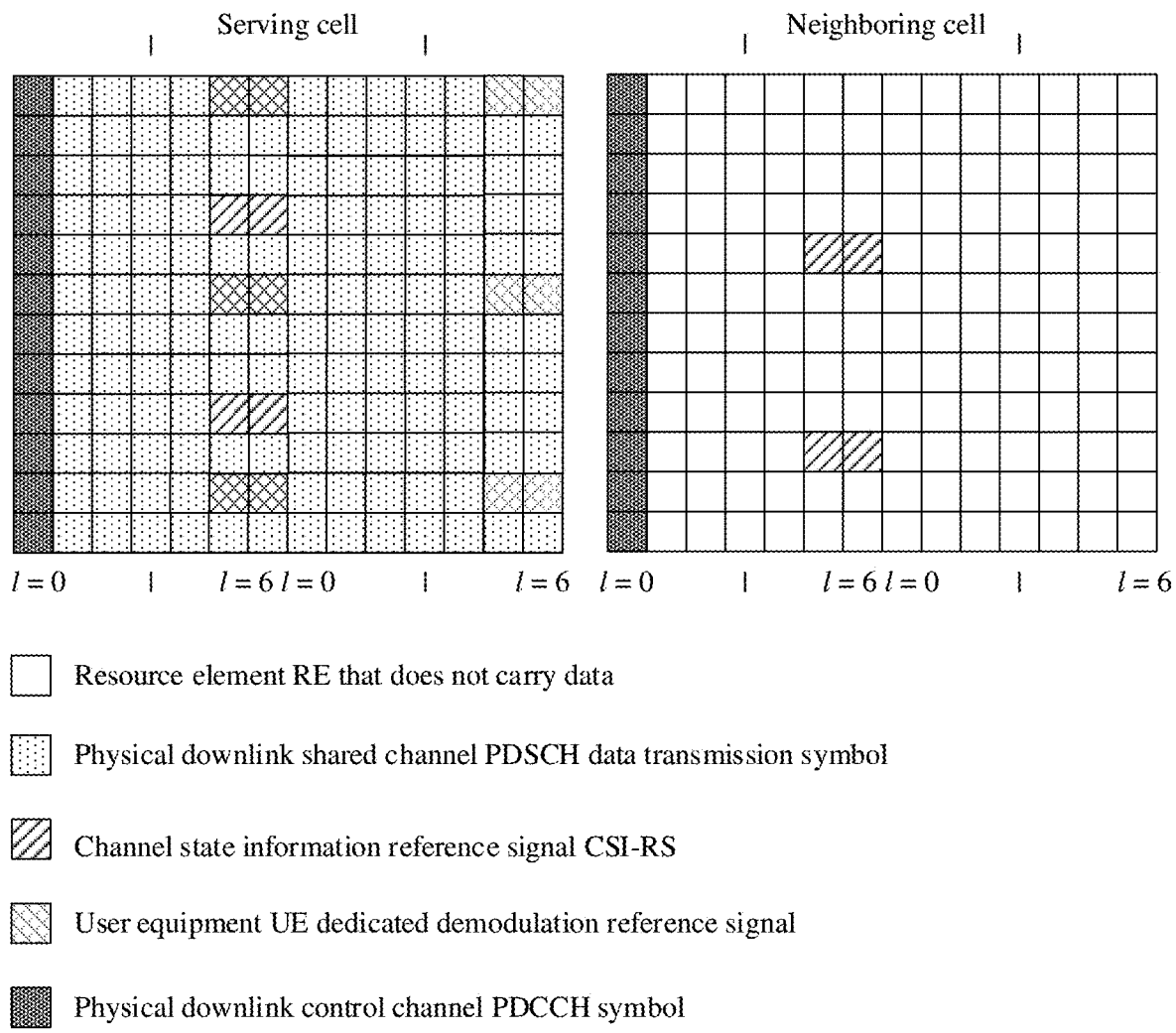
FIG. 3 is a schematic diagram of frequency domain positions of a CSI-RS of a serving cell and a CSI-RS of a neighboring cell.

After the CSI-RS is proposed, the CSI-RS is mainly used to measure and feed back information of a wireless channel such as a channel quality indicator (CQI), a rank (RI), and a precoding matrix indicator (PMI) to a base station to which the serving cell of the UE belongs. In a conventional technology, the UE is located in the overlapping area of the coverage of the serving cell and the coverage of the neighboring cell. For example, FIG. 2 is a schematic diagram in which the UE is located in the overlapping area of the coverage of the serving cell and the coverage of the neighboring cell. In this case, in addition to receiving the CSI-RS of the serving cell, the UE may further receive a CSI-RS of the neighboring cell. After receiving the CSI-RS of the neighboring cell, the UE does not need to perform any processing. The CSI-RS of the serving cell and the CSI-RS of the neighboring cell are separated by using time-frequency domain and may correspond to a same periodicity or different periodicities. FIG. 3 is a schematic diagram of a time-frequency domain position of a CSI-RS of a serving cell and a time-frequency domain position of a CSI-RS of a neighboring cell.

Refer to FIG. 2 and FIG. 3. It can be learned that different time-frequency domain positions are separately set for the CSI-RS of the serving cell and the CSI-RS of the neighboring cell, so that interference of the CSI-RS of the neighboring cell to the CSI-RS of the serving cell can be avoided. In some cases, if the neighboring cell is an intra-frequency neighboring cell of the serving cell, a frequency of the neighboring cell is the same as that of the serving cell. In this case, referring to FIG. 3, it can be learned that a frequency domain position that is of an RE carrying the CSI-RS of the neighboring cell and that is in a resource block (RB) may overlap a frequency domain position of an RE used by the serving cell to carry the PDSCH data. In this case, the CSI-RS delivered in the neighboring cell may cause interference to the PDSCH data delivered in the serving cell to the UE. The power of the RE carrying the CSI-RS of the neighboring cell may be superimposed on the RE carrying the PDSCH data of the serving cell. As a result, when the UE parses the RE at the time-frequency domain position, a parsing error may occur.

Based on the foregoing descriptions, an embodiment provides a data exchange method, to reduce an error rate of parsing PDSCH data delivered by UE to a serving cell. When the UE is located in an overlapping area of coverage of the serving cell and coverage of an intra-frequency neighboring cell of the serving cell, when the UE reports a measurement report to a base station, the measurement report carries a neighboring cell PCI of the intra-frequency neighboring cell. After receiving the measurement report, the base station determines, based on the neighboring cell PCI, configuration information corresponding to the intra-frequency neighboring cell. The configuration information indicates a first time-frequency domain position of an RE carrying a target signal, and the target signal is a downlink signal delivered to the UE by a base station to which the intra-frequency neighboring cell belongs. Then, the base station determines not to carry, when delivering the PDSCH data to the UE, the PDSCH data on the RE corresponding to the first time-frequency domain position, and notifies, by using a first indication message, the UE to skip, when receiving the PDSCH data, performing data channel demodulation on the RE corresponding to the first time-frequency domain position. In other words, data channel demodulation is performed when the RE that simultaneously carries the target signal of the intra-frequency neighboring cell and the PDSCH data of the serving cell and that corresponds to the first time-frequency domain position is skipped. When delivering the PDSCH data to the UE, the base station skips the RE that simultaneously carries the target signal of the intra-frequency neighboring cell and the PDSCH data of the serving cell and that corresponds to the first time-frequency domain position. Therefore, when receiving the PDSCH data, the UE also skips performing data channel parsing on the RE, so that interference, caused by the target signal delivered in the intra-frequency neighboring cell, to the PDSCH data delivered in the serving cell is avoided, thereby improving a success rate of demodulating the PDSCH data by the UE.

It can be learned from the foregoing descriptions that when the UE is located in the coverage of the serving cell and the coverage of the intra-frequency neighboring cell of the serving cell, the CSI-RS delivered in the neighboring cell may cause an error when the UE demodulates the PDSCH data delivered in the serving cell. In this embodiment and subsequent embodiments, an example in which the target signal is a CSI-RS is used for description. However, it should be noted that the target signal is described by using the CSI-RS as an example but is not limited to the CSI-RS. In practice, in addition to the CSI-RS, another downlink signal may also have a similar problem. When another downlink signal also has the similar problem, the method may also be used.

Figure 4:
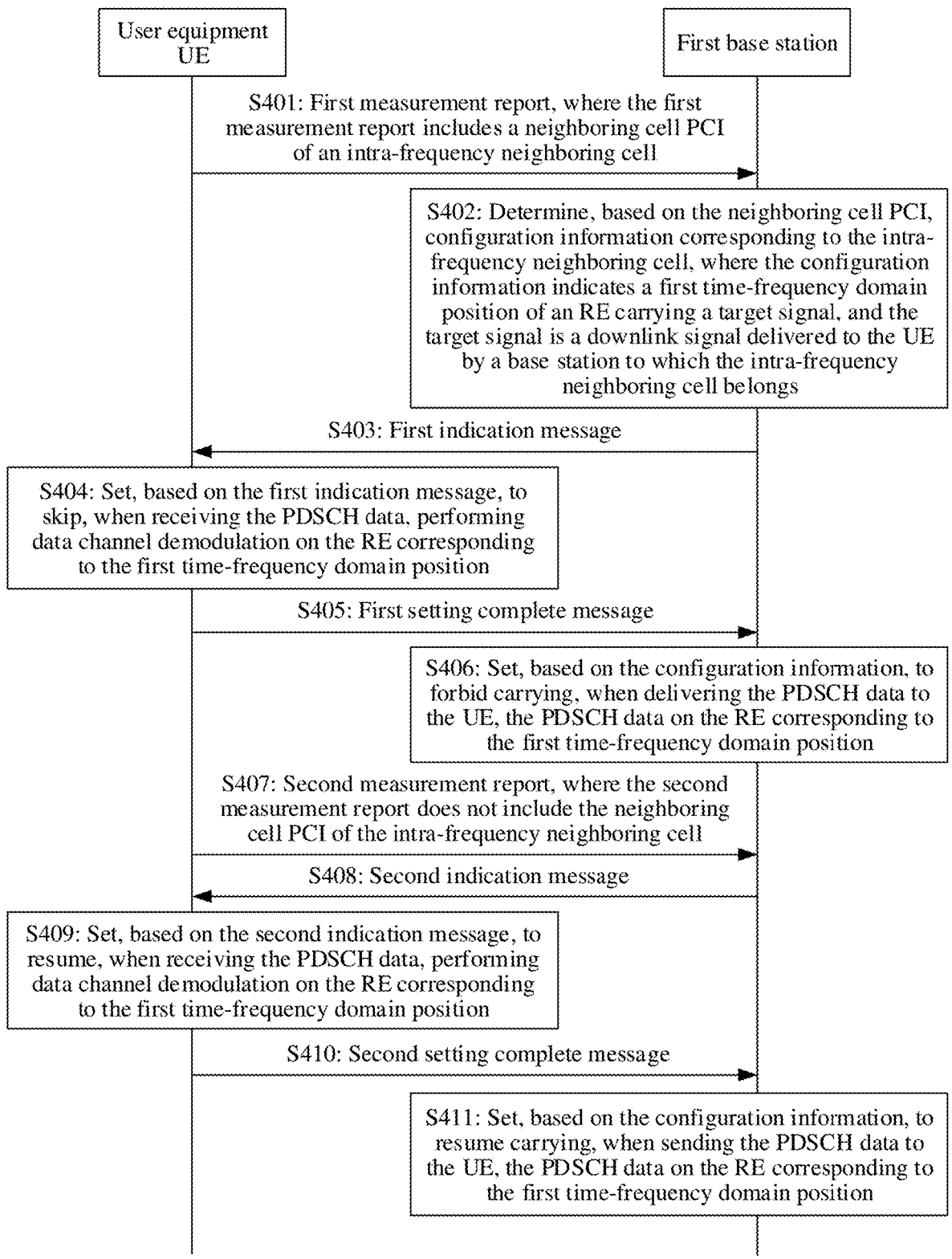
FIG. 4 is a schematic diagram of an embodiment of a data exchange method according to an embodiment.

Based on the scenario shown in FIG. 2, the UE is located in the overlapping area of the coverage of the serving cell and the coverage of the intra-frequency neighboring cell of the serving cell. FIG. 4 is a schematic diagram of an embodiment of a data exchange method. The method includes the following steps.

S401: UE sends a first measurement report to a first base station, where the first measurement report includes a neighboring cell PCI of an intra-frequency neighboring cell.

In an embodiment, as shown in FIG. 2, a relative position of the UE is in an overlapping area of coverage of a serving cell and coverage of a neighboring cell. The neighboring cell is one or more intra-frequency neighboring cells of the serving cell, and a base station to which the serving cell belongs is the first base station. When a reporting condition is satisfied, the UE is triggered, based on a periodicity or a specific event, to report the first measurement report to the first base station based on configuration information of a measurement report delivered in the serving cell.

In a conventional technology, the UE in the area may simultaneously receive a downlink signal of the serving cell and a downlink signal of the intra-frequency neighboring cell. For example, the downlink signal is a common reference signal (CRS). When the UE detects that a signal strength of the intra-frequency neighboring cell is relatively high and is close to a signal strength of the serving cell (where the signal strength of the serving cell is usually higher than that of the neighboring cell), the UE may set to carry, in the first measurement report reported to the first base station, the neighboring cell PCI of the intra-frequency neighboring cell, to notify the first base station to record the intra-frequency neighboring cell, so as to subsequently perform a related operation such as cell switching. The UE may determine, based on a difference between a measured parameter indicating the signal strength of the serving cell and a parameter indicating the signal strength of the intra-frequency neighboring cell, whether the signal strength of the intra-frequency neighboring cell is close to the signal strength of the serving cell. If the difference is small, the signal strength of the intra-frequency neighboring cell is close to the signal strength of the serving cell. If the difference is large, the signal strength of the intra-frequency neighboring cell is not close to the signal strength of the serving cell. The parameter indicating the signal strength of the serving cell and the parameter indicating the signal strength of the intra-frequency neighboring cell may include a plurality of types, for example, an RSRP, a received signal strength indication (RSSI), or reference signal received quality (RSRQ). Using the RSRP as an example, when the UE detects that a difference (obtained by subtracting a first RSRP by a second RSRP) between the first RSRP of the serving cell and the second RSRP of the intra-frequency neighboring cell is less than a preset value, the neighboring cell PCI of the intra-frequency neighboring cell may be set to be added to the first measurement report, to notify the first base station of a status of the intra-frequency neighboring cell. The preset value may be preset. The first RSRP is an average power that is detected by the UE and that is of an RE carrying a CRS of the serving cell, and the second RSRP is an average power that is detected by the UE and that is of an RE carrying a CRS of the intra-frequency neighboring cell. The first RSRP and the second RSRP may be respectively used to indicate the signal strength of the serving cell and the signal strength of the intra-frequency cell.

S402: The first base station determines, based on the neighboring cell PCI, configuration information corresponding to the intra-frequency neighboring cell, where the configuration information indicates a first time-frequency domain position of an RE carrying a target signal, and the target signal is a downlink signal delivered to the UE by a base station to which the intra-frequency neighboring cell belongs.

In an embodiment, after receiving the first measurement report, the first base station determines, based on the neighboring cell PCI of the intra-frequency neighboring cell carried in the first measurement report, the configuration information corresponding to the intra-frequency neighboring cell. The first base station may determine the configuration information corresponding to the intra-frequency neighboring cell. After receiving the first measurement report, the first base station obtains, through parsing, the neighboring cell PCI carried in the first measurement report, and then determines, based on the neighboring cell PCI, whether the base station to which the intra-frequency neighboring cell belongs is the first base station. If determining that the base station to which the intra-frequency neighboring cell belongs is the first base station, the first base station determines, based on a locally pre-stored correspondence between the neighboring cell PCI and the configuration information, the configuration information corresponding to the intra-frequency neighboring cell. If the first base station determines, based on the neighboring cell PCI, that the base station to which the intra-frequency neighboring cell belongs is a second base station, the first base station sends, to the second base station through an X2 interface between the first base station and the second base station, an obtaining request for the configuration information of the intra-frequency neighboring cell, where the obtaining request may be an X2 private message. Then, the first base station receives the configuration information that is sent by the second base station through the X2 interface and that corresponds to the intra-frequency neighboring cell.

It should be noted that the configuration information is used to indicate the first time-frequency domain position of the RE carrying the target signal, and the target signal is the downlink signal delivered to the UE by the base station to which the intra-frequency neighboring cell belongs.

In an embodiment, the target signal may be a CSI-RS, and the configuration information may be CSI-RS configuration information. The following describes a process of determining the first time-frequency domain position based on the CSI-RS configuration information.

The CSI-RS configuration information includes parameters such as a quantity of CSI-RS ports, a CSI-RS subframe configuration parameter, and a CSI-RS configuration parameter.

The determining first time domain in the first time-frequency domain position may include: The existing CSI-RS is not sent in every frame but is sent in a periodicity. In the time domain, the periodicity of the CSI-RS may be a periodicity such as 5 ms, 10 ms, 20 ms, 40 ms, or 80 ms. After obtaining the CSI-RS configuration information of the intra-frequency neighboring cell, the first base station may determine, based on the CSI-RS subframe configuration parameter and from an existing correspondence that is between a CSI-RS subframe configuration and a periodicity and that is shown in FIG. 5, a CSI-RS periodicity and a CSI-RS subframe offset delivered by the CSI-RS of the intra-frequency neighboring cell. The CSI-RS periodicity indicates a repetition periodicity of the CSI-RS signal in time domain, and the subframe offset is used to calculate an actual subframe position of the CSI-RS in a system frame. The first base station determines, based on the CSI-RS periodicity and the CSI-RS subframe offset, time domain corresponding to the RE carrying the CSI-RS of the intra-frequency neighboring cell, namely, a time point at which the CSI-RS of the intra-frequency neighboring cell is subsequently delivered.

In a conventional technology, when the base station sends the CSI-RS on different antenna ports, different frequency domain resources may be occupied. For a quantity of antenna ports, according to 3GPP Release 10, the CSI-RS is defined to use a total of eight ports, namely, logical ports 15 to 22. The CSI-RS may be transmitted by using two ports {15, 16}; four ports {15, 16, 17, 18}, or eight ports {15, 16, 17, 18, 19, 20, 21, 22}. FIG. 6 is a schematic diagram of CSI-RS time-frequency domain positions corresponding to an antenna port 15, an antenna port 17, an antenna port 19, and an antenna port 21. R15, R17, R19, and R21 respectively represent a CSI-RS on the antenna port 15, a CSI-RS on the antenna port 17, a CSI-RS on the antenna port 19, and a CSI-RS on the antenna port 21. It should be noted that the time-frequency domain position of the antenna port 15 and a time-frequency domain position of an antenna port 16 are the same, the time-frequency domain position of the antenna port 17 and a time-frequency domain position of an antenna port 18 are the same, the time-frequency domain position of the antenna port 19 and a time-frequency domain position of an antenna port 20 are the same, and the time-frequency domain position of the antenna port 21 and a time-frequency domain position of an antenna port 22 are the same. The time-frequency domain positions are differentiated by using different orthogonal code. Therefore, when determining the RE carrying the CSI-RS of the intra-frequency neighboring cell, the first base station first needs to determine a quantity of antenna ports used by the CSI-RS of the intra-frequency neighboring cell.

Figure 7B:
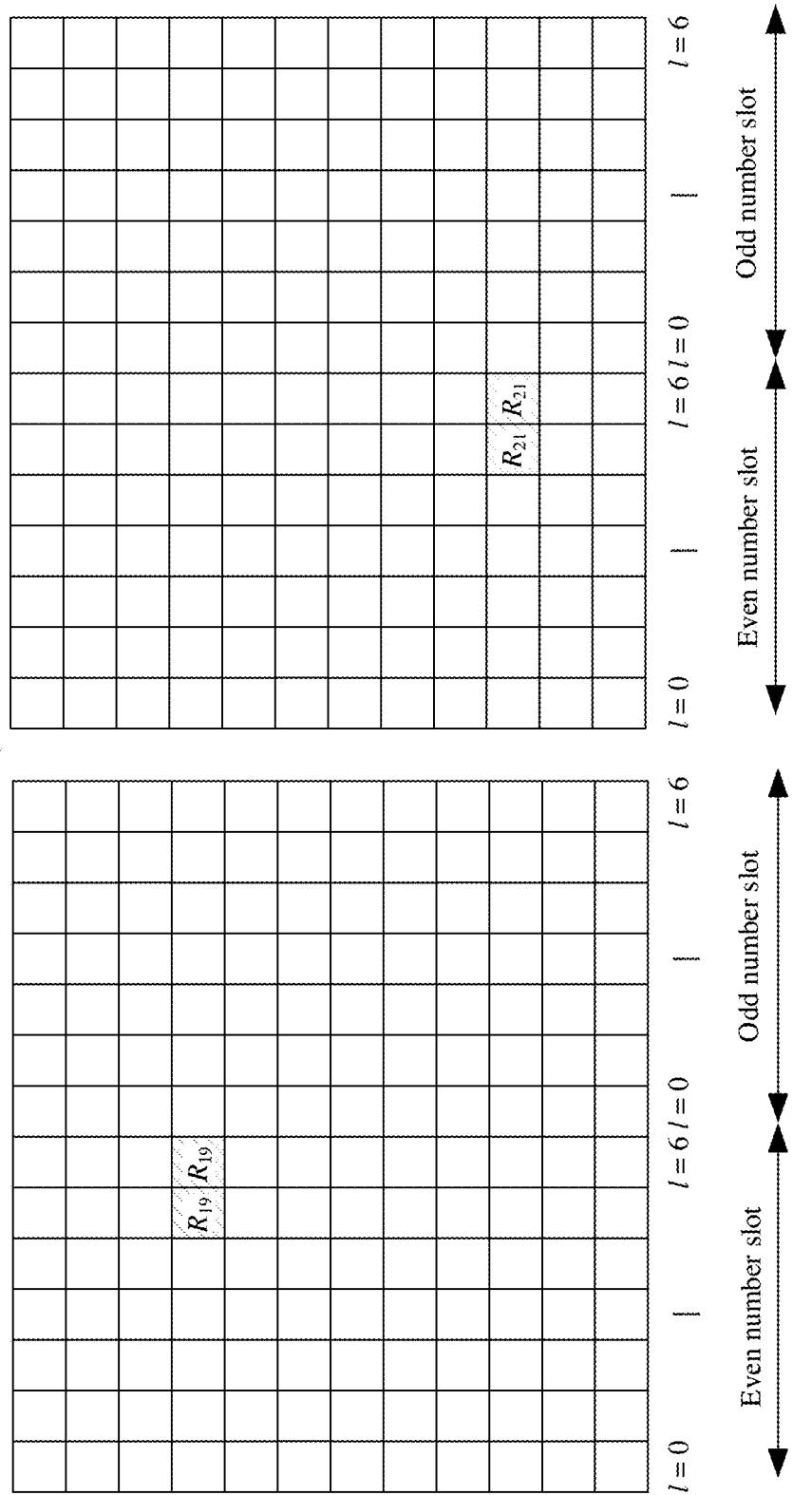

After obtaining the CSI-RS configuration information of the intra-frequency neighboring cell, the first base station may determine, based on a quantity of ports of the CSI-RS and a CSI-RS configuration parameter that are indicated by the CSI-RS configuration information and from a schematic diagram of frequency domain position settings of the RE carrying the CSI-RS under different parameters in a conventional technology shown in FIG. 7A and FIG. 7B, the frequency domain position of the RE carrying the CSI-RS of the intra-frequency neighboring cell. Referring to FIG. 7A and FIG. 7B, a configured quantity of CSI-RSs in FIG. 7A and FIG. 7B indicates the quantity of antenna ports used by the CSI-RS. k and l in (k, l) represent a formula substituted into 3GPP for calculating frequency domain positions. $n_s$ indicates a quantity of slots (slot number), indicates 20 slots, and is numbered {0-19}. $n_s$ mod 2=0 indicates the first half frame, and $n_s$ mod 2=1 indicates the second half frame. A subframe structure type 1 indicates frequency division duplex-long term evolution (FDD-LTE), and the type 1 indicates time division duplex-long term evolution (TDD-LTE).

S403: The first base station sends a first indication message to the UE based on the configuration information.

In an embodiment, after determining the configuration information corresponding to the intra-frequency neighboring cell, the first base station sends first indication information to the UE, where the first indication message may include information about the first time-frequency domain position. The first indication information is used to indicate the UE to skip, when receiving the PDSCH data, performing data channel demodulation on the RE corresponding to the first time-frequency domain position.

In an embodiment, the target signal may be a CSI-RS, and the configuration information may be CSI-RS configuration information. Before step S404, after determining the CSI-RS configuration information of the intra-frequency neighboring cell, the first base station maps the CSI-RS configuration information to zero-power CSI-RS configuration information and sets to carry the zero-power CSI-RS configuration information in the first indication message. The zero-power CSI-RS configuration information maps frequency domain information in the first time-frequency domain position in a form of a bitmap. A method of mapping the CSI-RS configuration information to the zero-power CSI-RS signal and a method of mapping the frequency domain information by using the bitmap are existing common practices, and details are not described in this embodiment.

In an embodiment, the first indication message is a first RRC connection reconfiguration message.

S404: The UE sets, based on the first indication message, to skip, when receiving the PDSCH data, performing data channel demodulation on the RE corresponding to the first time-frequency domain position.

Figure 8:
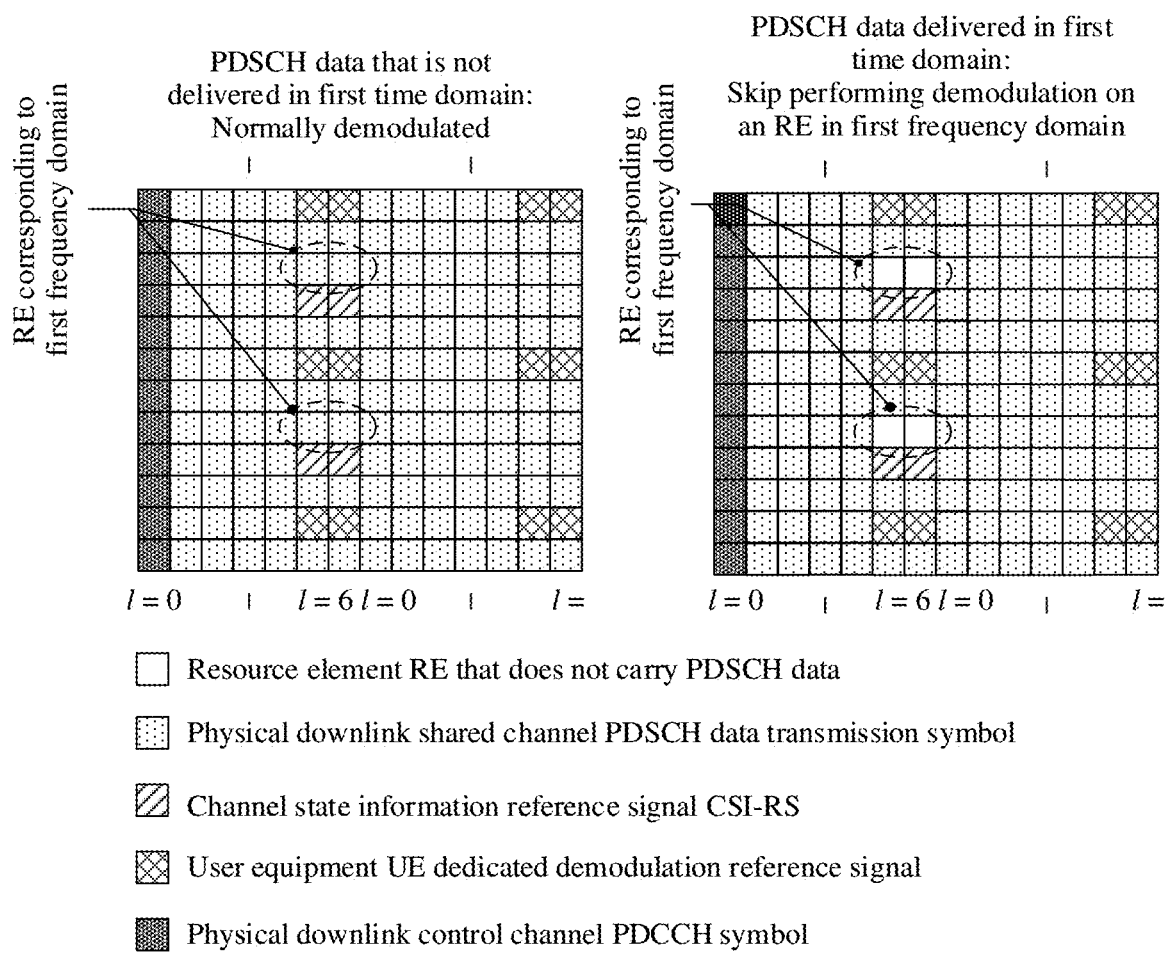
FIG. 8 is a schematic diagram of a scenario according to an embodiment.

In an embodiment, after receiving the first indication message, the UE sets, based on the first indication message, to skip, when receiving the PDSCH data, performing data channel demodulation on the RE corresponding to the first time-frequency domain position. Referring to FIG. 8, the first time-frequency domain position includes first frequency domain and first time domain. When the UE receives the PDSCH data at a time point that is not in first time domain, the UE normally performs data channel demodulation. When the UE receives the PDSCH data at a time point in first time domain, the UE skips performing data channel demodulation on the RE corresponding to first frequency domain.

S405: After determining that setting is completed, the UE sends a first setting complete message to the first base station.

In an embodiment, after the UE sets, based on the first indication message, to skip, when receiving the PDSCH data, performing data channel demodulation on the RE at the first time-frequency domain position, the UE may send the first setting complete message to the first base station, to notify the first base station that an air interface reconfiguration process is completed.

In an embodiment, the first setting complete message is a first RRC connection reconfiguration complete message.

S406: The first base station sets, based on the configuration information, to forbid carrying, when delivering the PDSCH data to the UE, the PDSCH data on the RE corresponding to the first time-frequency domain position.

In an embodiment, after determining, based on the first setting complete message that setting of the UE is completed, the first base station determines the first time-frequency domain position based on the configuration information of the intra-frequency neighboring cell. For a method of determining the first time-frequency domain position, refer to the related descriptions in step S402. Details are not described herein again. Then, the first base station sets to forbid carrying, when delivering the PDSCH data to the UE, the PDSCH data on the RE corresponding to the first time-frequency domain position.

Figure 9:
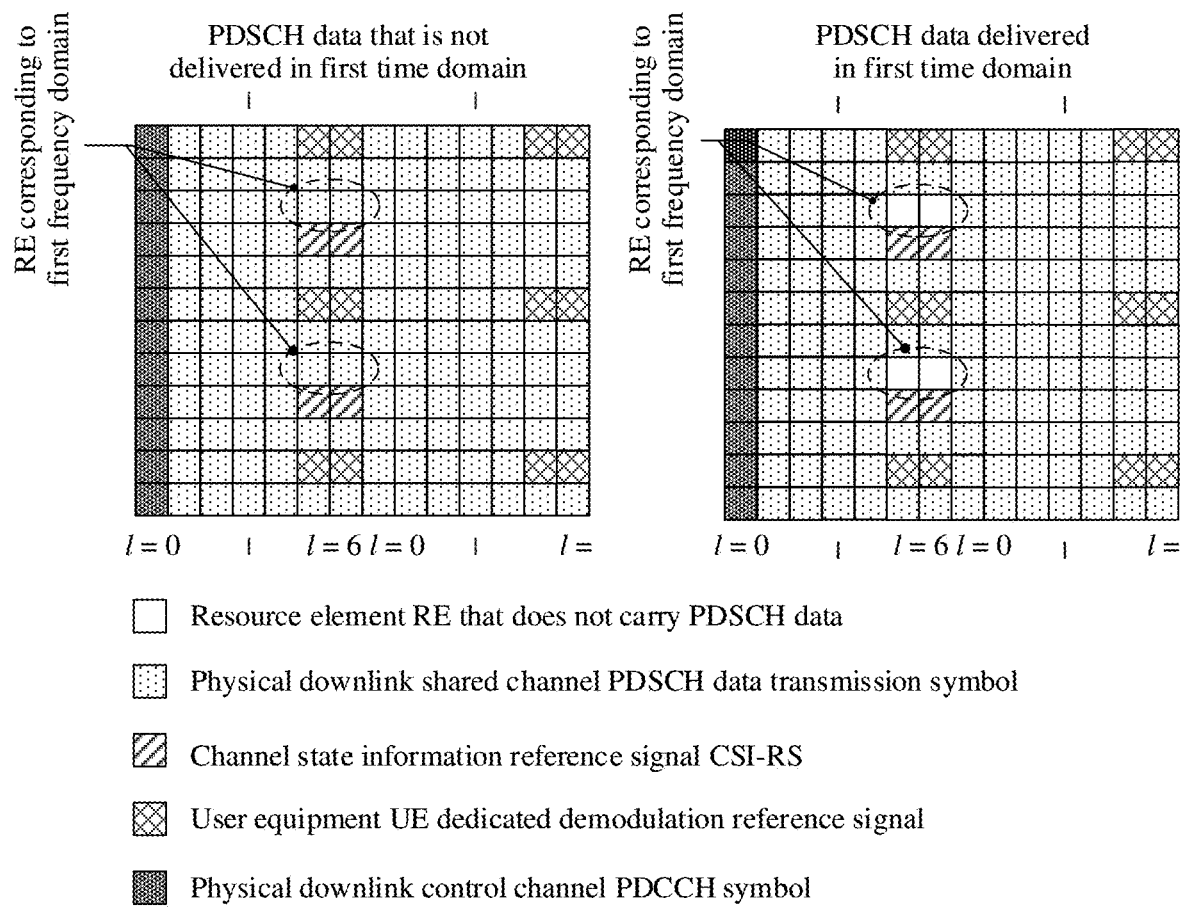
FIG. 9 is another schematic diagram of a scenario according to an embodiment.

An example in which the target signal is a CSI-RS and the configuration information is CSI-RS configuration information is used for description. After determining the RE at the first time-frequency domain position, the first base station forbids carrying, when delivering the PDSCH data, the PDSCH data on the RE corresponding to the first time-frequency domain position. In other words, the RE corresponding to the first time-frequency domain position is skipped, and the PDSCH data is carried only on another RE. Referring to a schematic diagram of a scenario shown in FIG. 9, the first time-frequency domain position includes first time domain and first frequency domain. When delivering the PDSCH data, the first base station skips, at a time point of first time domain, the RE corresponding to first frequency domain, and carries the PDSCH data on another RE.

S407: The UE sends a second measurement report to the first base station, where the second measurement report does not include the neighboring cell PCI of the intra-frequency neighboring cell.

In an embodiment, the UE may perform location movement. After the location movement, the serving cell does not change, but a location after the movement is not in the coverage of the original intra-frequency neighboring cell, or the signal strength of the original intra-frequency neighboring cell has a relatively little impact on the UE. In this case, the UE sends the second measurement report to the first base station, where the second measurement report does not carry the neighboring cell PCI of the previous intra-frequency neighboring cell.

S408: When determining that the second measurement report does not carry the neighboring cell PCI of the intra-frequency neighboring cell, the first base station sends a second indication message to the UE based on the configuration information.

In an embodiment, when the second measurement report received by the first base station does not carry the neighboring cell PCI, that is, after it is determined that the location of the UE changes, interference of the previous intra-frequency neighboring cell of the serving cell of the UE to currently receiving the PDSCH data by the UE is relatively small. In this case, the first base station generates the second indication message based on the previously recorded configuration information of the intra-frequency neighboring cell. The second indication message carries information about the first time-frequency domain position and a release identifier. The release identifier is used to indicate the UE to resume demodulation performed on the RE corresponding to the first time-frequency domain position.

In an embodiment, the second indication message is a second RRC connection reconfiguration message.

S409: The UE sets, based on the second indication message, to resume, when receiving the PDSCH data, performing data channel demodulation on the RE at the first time-frequency domain position.

In an embodiment, after receiving the second indication message, the UE sets, based on the information that is indicated by the release identifier and that is about the first time-frequency domain position, to resume performing data channel demodulation on the RE corresponding to the first time-frequency domain position. In other words, when receiving the PDSCH data, the UE no longer skips performing data channel demodulation on the RE at the first time-frequency domain position.

S410: After determining that setting is completed, the UE sends a second setting complete message to the first base station.

In an embodiment, after the UE sets, based on the second indication message, to resume, when receiving the PDSCH data, performing data channel demodulation on the RE at the first time-frequency domain position, the UE may send the second configuration complete message to the first base station.

In an embodiment, the second configuration complete message is a second RRC connection reconfiguration complete message.

S411: The first base station sets, based on the configuration information, to resume carrying, when delivering the PDSCH data to the UE, the PDSCH data on the RE corresponding to the first time-frequency domain position.

In an embodiment, when the second measurement report received by the first base station does not carry the neighboring cell PCI, that is, after determining that the location of the UE changes, interference of the previous intra-frequency neighboring cell of the serving cell of the UE to currently receiving the PDSCH data by the UE is relatively small. In this case, after determining that setting of the UE succeeds, the first base station sets, based on the previously recorded configuration information of the intra-frequency neighboring cell, to resume carrying, when delivering the PDSCH data to the UE, the PDSCH data on the RE corresponding to the first time-frequency domain position.

It should be noted that step S407 to step S411 are optional steps.

In step S407 to step S411, after the UE moves, the UE reports the second measurement report to the first base station. If the first base station determines, based on the second measurement report, that interference, caused by the target signal delivered in the intra-frequency neighboring cell of the serving cell of the UE, to the PDSCH data delivered in the serving cell is relatively small (the second measurement report does not carry the neighboring cell PCI of the intra-frequency neighboring cell), the first base station switches a status, clears the previous setting, resumes carrying the PDSCH data on the RE that is previously forbidden and that corresponds to the first time-frequency domain, and sends the second indication message to the UE, so that the UE sets, based on the second indication message, to re-demodulate the RE corresponding to the first time-frequency domain position. Therefore, a PDSCH can be fully used, avoiding waste of frequency domain resources.

It can be learned from the foregoing solutions that the embodiments have the following advantages:

In this solution, when the UE is located in the overlapping area of the coverage of the serving cell and the coverage of the intra-frequency neighboring cell of the serving cell, the first measurement report reported to the first base station carries the neighboring cell PCI of the intra-frequency neighboring cell. After receiving the first measurement report, the first base station determines, based on the neighboring cell PCI, the configuration information corresponding to the intra-frequency neighboring cell. The configuration information indicates a first time-frequency domain position of an RE carrying a target signal, and the target signal is a downlink signal delivered to the UE by a base station to which the intra-frequency neighboring cell belongs. Then, the first base station determines not to carry, when delivering the PDSCH data to the UE, the PDSCH data on the RE corresponding to the first time-frequency domain position, and notifies, by using the first indication message, the UE to skip, when receiving the PDSCH data, performing data channel demodulation on the RE corresponding to the first time-frequency domain position. In other words, data channel demodulation is performed when the RE that simultaneously carries the target signal of the intra-frequency neighboring cell and the PDSCH data of the serving cell and that corresponds to the first time-frequency domain position is skipped. When delivering the PDSCH data to the UE, the first base station skips the RE that simultaneously carries the target signal of the intra-frequency neighboring cell and the PDSCH data of the serving cell and that corresponds to the first time-frequency domain position. Therefore, when receiving the PDSCH data, the UE also skips performing data channel parsing on the RE, so that interference, caused by the target signal delivered in the intra-frequency neighboring cell, to the PDSCH data delivered in the serving cell is avoided, thereby improving a success rate of demodulating the PDSCH data by the UE.

Figure 10A:
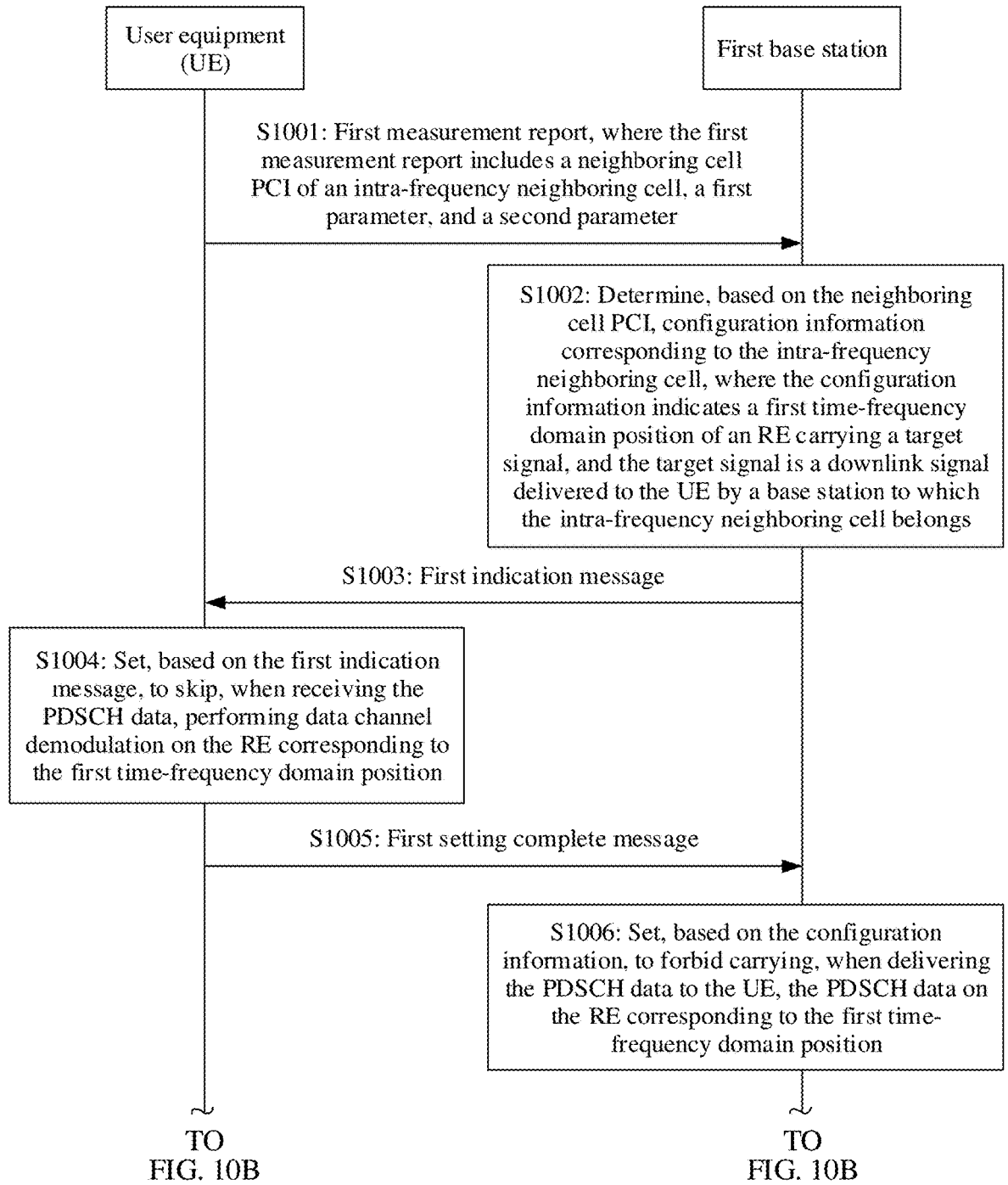
FIG. 10A and FIG. 10B are schematic diagrams of an embodiment of a data exchange method according to an embodiment.
Figure 10B:
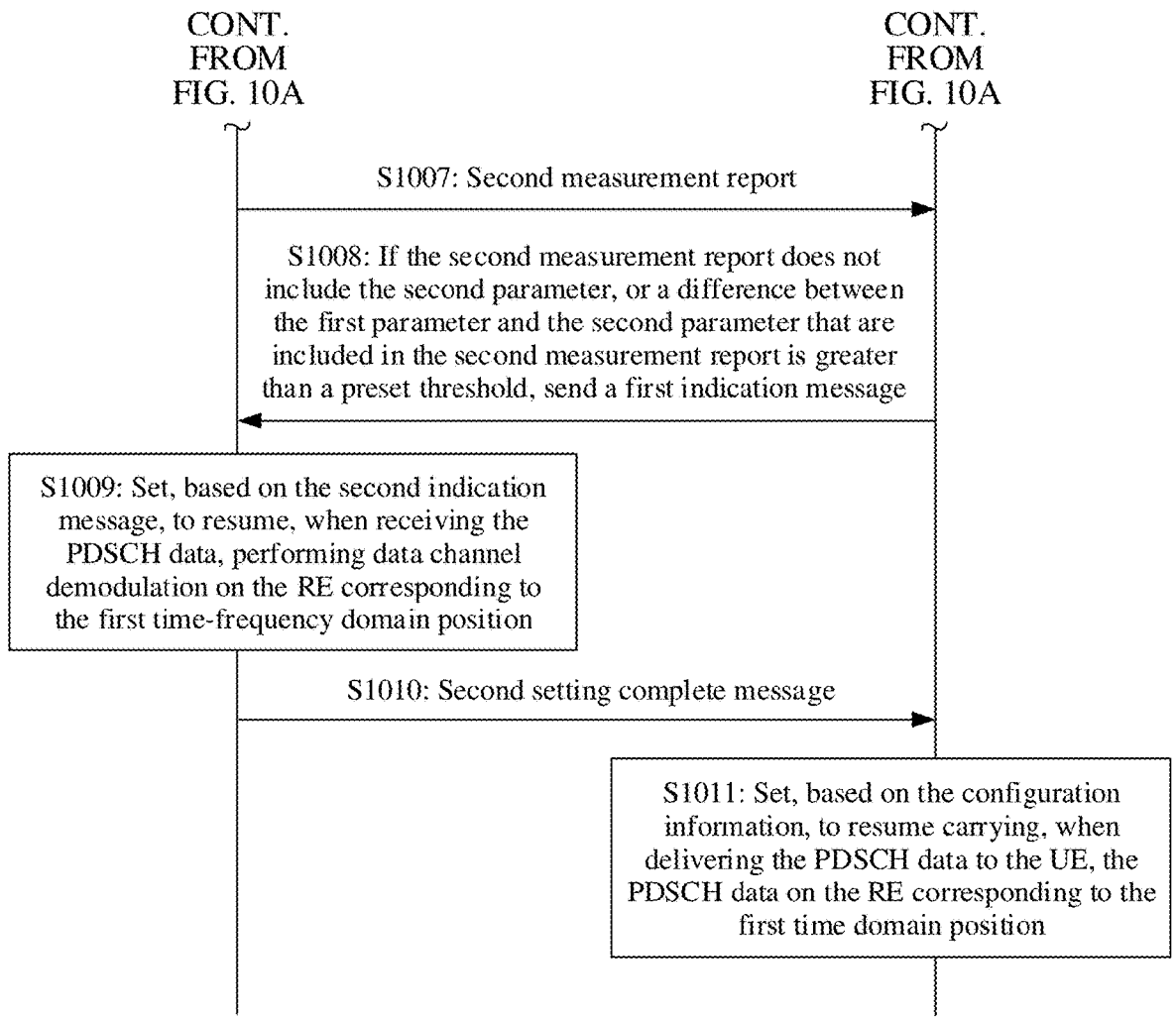

FIG. 10A and FIG. 10B are schematic diagrams of an embodiment of a data exchange method. The method includes the following steps.

S1001: UE sends a first measurement report to a first base station, where the first measurement report includes a neighboring cell PCI of an intra-frequency neighboring cell, a first parameter, and a second parameter, the first parameter indicates a signal strength that is measured by the UE and that is of a serving cell, and the second parameter is used to indicate a signal strength that is measured by the UE and that is of the intra-frequency neighboring cell.

In an embodiment, as shown in FIG. 2, a relative position of the UE is in an overlapping area of coverage of the serving cell and coverage of a neighboring cell. The neighboring cell is the intra-frequency neighboring cell of the serving cell, and a base station to which the serving cell belongs is the first base station. The UE is triggered, based on a periodicity or a specific event, to report the measurement report to the first base station based on configuration information of a measurement report delivered in the serving cell.

In a conventional technology, the UE in the area may simultaneously receive a CRS of the serving cell and a CRS of the intra-frequency neighboring cell. When the UE detects that a difference (obtaining by subtracting a first RSRP by a second RSRP) between the first RSRP of the serving cell and the second RSRP of the intra-frequency neighboring cell is less than a preset value, the neighboring cell PCI of the intra-frequency neighboring cell may be set to be added to the first measurement report, to notify the first base station of a status of the intra-frequency neighboring cell. Generally, the preset value may be set to 6 dB. The first RSRP is an average power that is detected by the UE and that is of an RE carrying a CRS of the serving cell, and the second RSRP is an average power that is detected by the UE and that is of an RE carrying a CRS of the intra-frequency neighboring cell. The first RSRP and the second RSRP may be respectively used to indicate the signal strength of the serving cell and the signal strength of the intra-frequency cell. The first measurement report may further include the first parameter and the second parameter, where the first parameter indicates the signal strength that is measured by the UE and that is of the serving cell, and the second parameter is used to indicate the signal strength that is measured by the UE and that is of the intra-frequency neighboring cell. The first parameter and the second parameter may be a plurality of types of parameters. For example, the first parameter may be the first RSRP, and the second parameter may be the second RSRP. In addition, the first parameter may alternatively be a first received signal strength indicator (RSSI) corresponding to the serving cell, the second parameter may alternatively be a second RSSI corresponding to the intra-frequency neighboring cell. The first parameter may alternatively be first reference signal received quality (RSRQ), and the second parameter may alternatively be second reference signal received quality (RSRQ).

S1002: The first base station determines, based on the neighboring cell PCI, configuration information corresponding to the intra-frequency neighboring cell, where the configuration information indicates a first time-frequency domain position of an RE carrying a target signal, and the target signal is a downlink signal delivered to the UE by a base station to which the intra-frequency neighboring cell belongs.

In an embodiment, after receiving the first measurement report, the first base station determines, based on the neighboring cell PCI of the intra-frequency neighboring cell carried in the first measurement report, the configuration information corresponding to the intra-frequency neighboring cell. For the method of determining the configuration information, refer to the related descriptions in step S402 in the embodiment shown in FIG. 4. Details are not described herein again.

It should be noted that the configuration information indicates the first time-frequency domain position of the RE carrying the target signal, and the target signal is the downlink signal delivered to the UE by the base station to which the intra-frequency neighboring cell belongs.

In an embodiment, the target signal may be a CSI-RS, and the configuration information may be CSI-RS configuration information. For the method of determining the first time-frequency domain position based on the CSI-RS configuration information, refer to the related descriptions in step S402 in the embodiment shown in FIG. 4. Details are not described herein again.

In an embodiment, the first base station determines whether a difference between the first parameter and the second parameter is less than a preset threshold. When determining that the difference is less than the preset threshold, the first base station further determines, based on the neighboring cell PCI, the configuration information corresponding to the intra-frequency neighboring cell. Based on step S1001, the first parameter and the second parameter respectively indicate the signal strength of the serving cell and the signal strength of the intra-frequency cell. When the difference between the first parameter and the second parameter is less than the preset threshold, that is, when the signal strength of the intra-frequency neighboring cell is close to the signal strength of the serving cell, interference of the intra-frequency neighboring cell to the serving cell is relatively strong. In this case, the first base station further determines, based on the neighboring cell PCI, the configuration information corresponding to the intra-frequency neighboring cell, and performs subsequent steps based on the configuration information.

S1003: If the difference that is between the first parameter and the second parameter and that is in the first measurement report is less than or equal to the preset threshold, the first base station sends a first indication message to the UE based on the configuration information.

In an embodiment, after determining the configuration information of the intra-frequency neighboring cell, if determining that the difference that is between the first parameter and the second parameter and that is carried in the first measurement report is less than or equal to the preset threshold, that is, determining that the interference of the intra-frequency neighboring cell to the serving cell is relatively strong, the first base station further sends the first indication message to the UE based on the configuration information. The first indication message is used to indicate the UE to skip, when receiving the PDSCH data, performing data channel demodulation on the RE corresponding to the first time-frequency domain position.

S1004: The UE sets, based on the first indication message, to skip, when receiving the PDSCH data, performing data channel demodulation on the RE corresponding to the first time-frequency domain position.

S1005: After determining that setting is completed, the UE sends a first setting complete message to the first base station.

S1006: The first base station sets, based on the configuration information, to forbid carrying, when delivering the PDSCH data to the UE, the PDSCH data on the RE corresponding to the first time-frequency domain position.

It should be noted that steps S1004 to S1006 are similar to steps S404 to S406 shown in FIG. 4, and details are not described herein again.

S1007: The UE sends a second measurement report to the first base station.

In an embodiment, the UE may perform location movement. After the location of the UE changes, the serving cell does not change. In this case, the UE sends the second measurement report to the first base station.

S1008: If the second measurement report does not include the second parameter, or the difference that is between the first parameter and the second parameter and that is included in the second measurement report is greater than the preset threshold, the first base station sends a second indication message to the UE based on the configuration information.

In an embodiment, after receiving the second measurement report, if the first base station determines that the second measurement report does not include the second parameter (for example, the UE moves beyond the overlapping area of the coverage of the serving cell and the coverage of the intra-frequency neighboring cell), or determines that the second measurement report carries the second parameter, but the difference that is between the first parameter and the second parameter and that is carried in the second measurement report is greater than the preset threshold (that is, the UE is still located in the overlapping area, but the signal strength is relatively small, and cannot cause interference to the PDSCH data delivered in the serving cell), the first base station sends the second indication message to the UE, to indicate the UE to clear the previous setting. In other words, the second indication message indicates the UE to resume, when receiving the PDSCH data, performing data channel demodulation on the RE corresponding to the first time-frequency domain position. The second indication message carries information about the first time-frequency domain position and a release identifier. The release identifier is used to indicate the UE to resume demodulation performed on the RE corresponding to the first time-frequency domain position.

In an embodiment, the first indication message is a first RRC connection reconfiguration message.

S1009: The UE sets, based on the second indication message, to resume, when receiving the PDSCH data, performing data channel demodulation on the RE corresponding to the first time-frequency domain position.

S1010: After determining that setting is completed, the UE sends a second setting complete message to the first base station.

S1011: The first base station sets, based on the configuration information, to resume carrying, when delivering the PDSCH data to the UE, the PDSCH data on the RE corresponding to the first time-frequency domain position.

It should be noted that steps S1009 to S1011 are similar to steps S409 to S411 in the embodiment shown in FIG. 4, and details are not described herein again.

It should be noted that step S1007 to step S1011 are optional steps.

In step S1007 to step S1011, after the UE moves, the UE reports the second measurement report to the first base station. If the first base station determines, based on the second measurement report, that interference, caused by the target signal delivered in the intra-frequency neighboring cell of the serving cell of the UE, to the PDSCH data delivered in the serving cell is relatively small (the second measurement report does not carry the second parameter, or the difference that is between the first parameter and the second parameter and that is carried in the second measurement report is relatively large), the first base station switches a status, clears the previous setting, resumes carrying the PDSCH data on the RE that is previously forbidden and that corresponds to the first time-frequency domain, and sends the second indication message to the UE, so that the UE sets, based on the second indication message, to re-demodulate the RE corresponding to the first time-frequency domain position. Therefore, a PDSCH can be fully used, and a waste of frequency domain resources is avoided.

It can be learned from the foregoing solutions that the embodiments have the following advantages:

In this solution, when the UE is located in the overlapping area of the coverage of the serving cell and the coverage of the intra-frequency neighboring cell of the serving cell, the first measurement report reported to the first base station carries the neighboring cell PCI of the intra-frequency neighboring cell, the first parameter, and the second parameter. The first parameter and the second parameter respectively indicate the signal strength of the serving cell and the signal strength of the intra-frequency neighboring cell. After receiving the first measurement report, the first base station determines, based on the neighboring cell PCI, the configuration information corresponding to the intra-frequency neighboring cell. The configuration information indicates a first time-frequency domain position of the RE carrying the target signal, and the target signal is the downlink signal delivered to the UE by the base station to which the intra-frequency neighboring cell belongs. Then, when determining that the difference between the first parameter and the second parameter is less than the preset threshold, the UE sets not to carry, when delivering the PDSCH data to the UE, the PDSCH data on the RE corresponding to the first time-frequency domain position, and notifies, by using a first indication message, the UE to skip, when receiving the PDSCH data, performing data channel demodulation on the RE corresponding to the first time-frequency domain position. In other words, data channel demodulation is performed when the RE that simultaneously carries the target signal of the intra-frequency neighboring cell and the PDSCH data of the serving cell and that corresponds to the first time-frequency domain position is skipped. When delivering the PDSCH data to the UE, the first base station skips the RE that simultaneously carries the target signal of the intra-frequency neighboring cell and the PDSCH data of the serving cell and that corresponds to the first time-frequency domain position. Therefore, when receiving the PDSCH data, the UE also skips performing data channel parsing on the RE, so that interference, caused by the target signal delivered in the intra-frequency neighboring cell, to the PDSCH data delivered in the serving cell is avoided, thereby improving a success rate of demodulating the PDSCH data by the UE.

Figure 11:
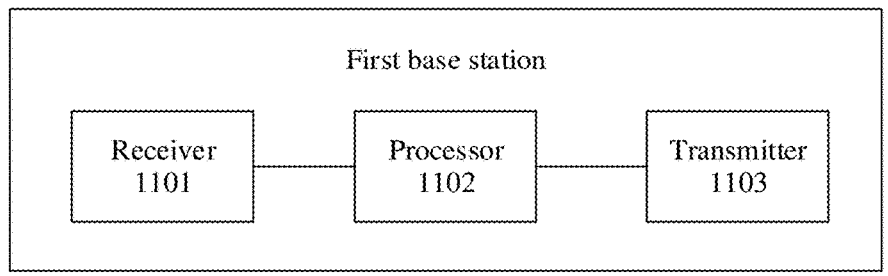
FIG. 11 is a schematic diagram of an embodiment of a first base station according to an embodiment.

FIG. 11 is a schematic diagram of an embodiment of a first base station. The first base station includes:

a receiver 1101, configured to receive a first measurement report sent by user equipment UE, where the first measurement report may include a neighboring cell physical cell identifier PCI of an intra-frequency neighboring cell;

a processor 1102, configured to determine, based on the neighboring cell PCI, configuration information corresponding to the intra-frequency neighboring cell, where the configuration information indicates a first time-frequency domain position of a resource element RE carrying a target signal, and the target signal is a downlink signal sent to the UE by a base station to which the intra-frequency neighboring cell belongs; and a transmitter 1103, configured to send a first indication message to the UE based on the configuration information, where the first indication message is used to indicate the UE to set to skip, when receiving PDSCH data, performing data channel demodulation on the RE corresponding to the first time-frequency domain position, where the receiver 1101 is further configured to receive a first setting complete message sent by the UE, where the first setting complete message is sent by the UE after the UE determines that setting is completed; and the processor 1102 is further configured to set, based on the configuration information, to forbid carrying, when delivering the physical layer downlink shared channel PDSCH data to the UE, the PDSCH data on the RE corresponding to the first time-frequency domain position.

In an embodiment, the processor 1102 is configured to:

determine, based on the neighboring cell PCI, that the base station to which the intra-frequency neighboring cell belongs is the first base station; and determine, based on a preset correspondence between the neighboring cell PCI and the configuration information, the configuration information corresponding to the intra-frequency neighboring cell.

In an embodiment:

the processor 1102 is configured to determine, based on the neighboring cell PCI, that the base station to which the intra-frequency neighboring cell belongs is a second base station;

the transmitter 1103 is further configured to send, to the second base station, an obtaining request for the configuration information; and the receiver 1101 is further configured to receive the configuration information sent by the second base station.

In an embodiment, the target signal is a channel state information reference signal CSI-RS, and the configuration information is CSI-RS configuration information.

In an embodiment:

the processor 1102 is further configured to obtain zero-power CSI-RS configuration information based on the CSI-RS configuration information; and set to include the zero-power CSI-RS configuration information in the first indication message, where the zero-power CSI-RS configuration information is used to indicate the UE to skip, when receiving the PDSCH data, performing data channel demodulation on the RE corresponding to the first time-frequency domain position.

In an embodiment:

the receiver 1101 is further configured to receive a second measurement report sent by the UE, where the second measurement report does not carry the neighboring cell PCI;

the transmitter 1103 is further configured to: when determining that the second measurement report does not carry the neighboring cell PCI, send a second indication message to the UE based on the configuration information, where the second indication message is used to indicate the UE to set to resume, when receiving the PDSCH data, performing data channel demodulation on the RE corresponding to the first time-frequency domain position, where the receiver 1101 is further configured to receive a second setting complete message sent by the UE, where the second setting complete message is sent by the UE after the UE determines that setting is completed; and the processor 1102 is further configured to set, based on the configuration information, to resume carrying, when delivering the PDSCH data to the UE, the PDSCH data on the RE corresponding to the first time-frequency domain position.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE; and the transmitter 1103 is configured to: if determining that a difference that is between the first parameter and the second parameter and that may be included in the first measurement report is less than or equal to a preset threshold, send a first indication message to the UE based on the configuration information.

In an embodiment:

the receiver 1101 is further configured to receive a second measurement report sent by the UE;

the transmitter 1103 is further configured to: when determining that the second measurement report may not include the second parameter, or the difference that is between the first parameter and the second parameter and that may be included in the second measurement report is greater than the preset threshold, send a second indication message to the UE based on the configuration information, where the second indication message is used to indicate the UE to resume, when receiving the PDSCH data, performing data channel demodulation on the RE corresponding to the first time-frequency domain position, where the receiver 1101 is further configured to receive a second setting complete message sent by the UE, where the second setting complete message is sent by the UE after the UE determines that setting is completed; and the processor 1102 is further configured to set, based on the configuration information, to resume carrying, when delivering the PDSCH data to the UE, the PDSCH data on the RE corresponding to the first time-frequency domain position.

In an embodiment, the first parameter is a first reference signal received power RSRP, and the second parameter is a second RSRP.

Figure 12:
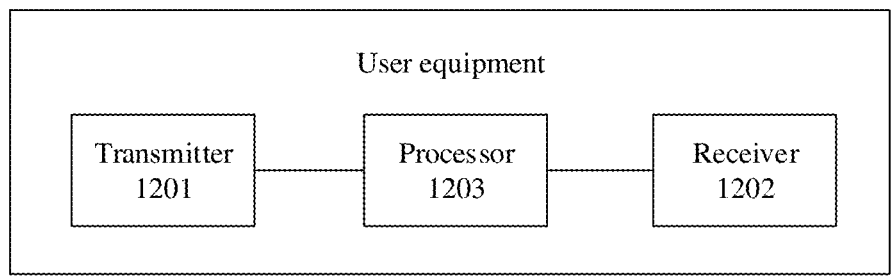
FIG. 12 is a schematic diagram of an embodiment of user equipment according to an embodiment.

FIG. 12 is a schematic diagram of an embodiment of user equipment. The user equipment includes:

a transmitter 1201, configured to send a first measurement report to a first base station, where the first measurement report may include a physical cell identifier PCI of an intra-frequency neighboring cell, the neighboring cell PCI is used to indicate the first base station to determine configuration information corresponding to the intra-frequency neighboring cell, the configuration information indicates a first time-frequency domain position of a resource element RE carrying a target signal, and the target signal is a downlink signal sent to the UE by a base station to which the intra-frequency neighboring cell belongs;

a receiver 1202, configured to receive a first indication message sent by the first base station based on the configuration information; and a processor 1203, configured to set, based on the first indication message, to skip, after receiving physical layer downlink shared channel PDSCH data sent by the first base station, performing data channel demodulation on the RE corresponding to the first time-frequency domain position, where the transmitter 1202 is further configured to send a first setting complete message to the first base station after determining that setting is completed.

In an embodiment, the target signal is a channel state information reference signal CSI-RS, and the configuration information is CSI-RS configuration information.

In an embodiment, the first indication message may include zero-power CSI-RS configuration information, and the zero-power CSI-RS configuration information is obtained by the first base station based on the CSI-RS configuration information.

The processor 1203 is configured to set, based on the zero-power CSI-RS configuration information, to skip, after receiving the PDSCH data sent by the first base station, performing data channel demodulation on the RE corresponding to the first time-frequency domain position.

In an embodiment:
the transmitter 1202 is further configured to send a second measurement report to the first base station, where the second measurement report may not include the neighboring cell PCI of the intra-frequency neighboring cell;

the receiver 1201 is further configured to receive a second indication message sent by the first base station based on the configuration information, where the second indication message is sent by the first base station when the first base station determines that the second measurement report may not include the neighboring cell PCI of the intra-frequency neighboring cell; and the processor 1203 is further configured to set, based on the second indication message, to resume, when receiving the PDSCH data, performing data channel demodulation on the RE corresponding to the first time-frequency domain position, where the transmitter 1202 is further configured to send a second setting complete message to the first base station after determining that setting is completed.

In an embodiment, the first measurement report may further include a first parameter and a second parameter, the first parameter indicates a signal strength that is of the serving cell and that is measured by the UE, and the second parameter indicates a signal strength that is of the intra-frequency neighboring cell and that is measured by the UE; and the receiver 1201 is configured to receive the first indication message sent by the first base station based on the configuration information, where the first indication message is sent by the first base station when the first base station determines that a difference between the first parameter and the second parameter is less than or equal to a preset threshold.

In an embodiment:
the transmitter 1202 is further configured to send a second measurement report to the first base station;

the receiver 1201 is further configured to receive a second indication message sent by the first base station, where the second indication message is sent by the first base station when the first base station determines that the second measurement report may not include the second parameter, or that the difference that is between the first parameter and the second parameter and that may be included in the second measurement report is greater than the preset threshold; and the processor 1203 is further configured to set, based on the second indication message, to resume, when receiving the PDSCH data, performing data channel demodulation on the RE corresponding to the first time-frequency domain position, where the UE sends a second setting complete message to the first base station after determining that setting is completed.

In an embodiment, the first parameter is a first reference signal received power RSRP, and the second parameter is a second RSRP.

Figure 13:
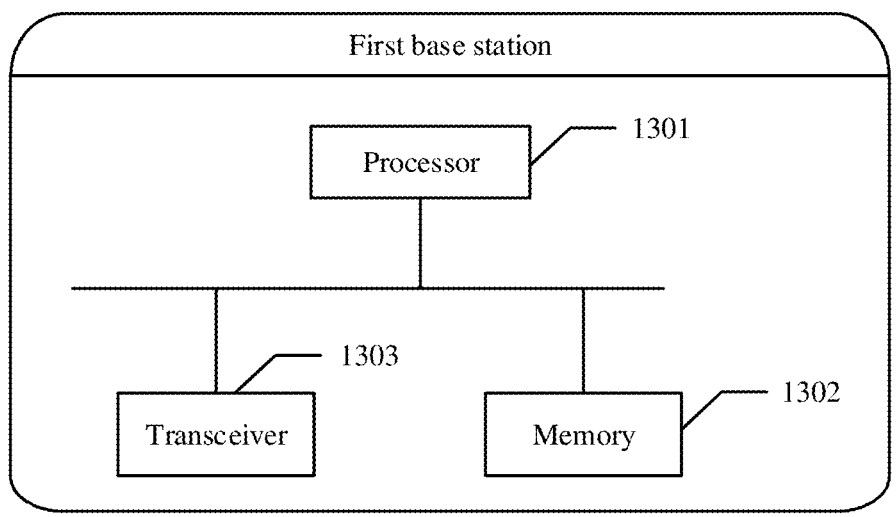
FIG. 13 is another schematic diagram of an embodiment of a first base station according to an embodiment.

FIG. 13 is another schematic diagram of an embodiment of a first base station. The first base station includes:
a processor 1301, a memory 1302, and a transceiver 1303.

The transceiver 1303 is configured to communicate with an apparatus other than the first base station;
the memory 1302 is configured to store instruction code; and the processor 1301 is configured to execute the instruction code, to enable the first base station to perform the method performed by the first base station in the embodiment shown in FIG. 4 or FIG. 10A and FIG. 10B.

Figure 14:
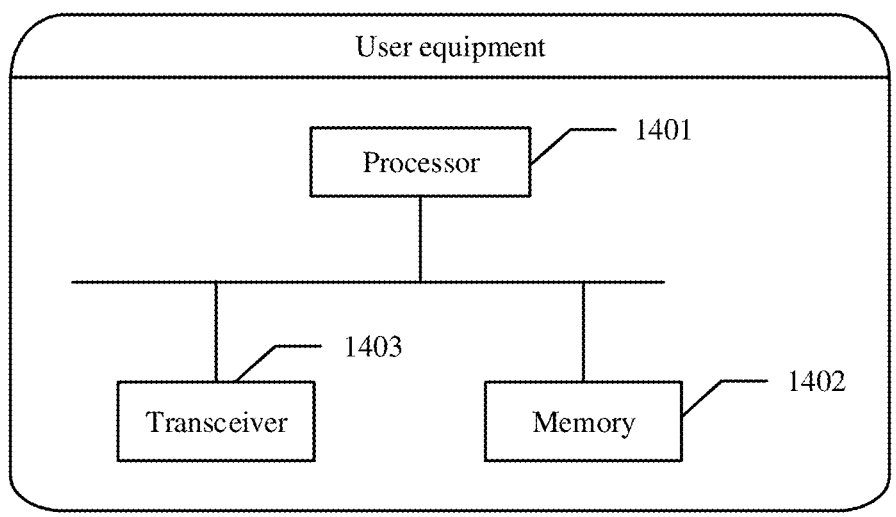
FIG. 14 is another schematic diagram of an embodiment of user equipment according to an embodiment.

FIG. 14 is another schematic diagram of an embodiment of user equipment. The user equipment includes:
a processor 1401, a memory 1402, and a transceiver 1403.

The transceiver 1403 is configured to communicate with an apparatus other than the user equipment;
the memory 1402 is configured to store instruction code; and the processor 1401 is configured to execute the instruction code, to enable the user equipment to perform the method performed by the user equipment in the embodiment shown in FIG. 4 or FIG. 10A and FIG. 10B.

An embodiment further provides a computer storage medium. The medium stores instructions, and when the instructions are run on a computer, the computer is enabled to perform the method performed by the first base station in the embodiment shown in FIG. 4 or FIG. 10A and FIG. 10B.

An embodiment further provides a computer storage medium. The medium stores instructions, and when the instructions are run on a computer, the computer is enabled to perform the method performed by the user equipment in the embodiment shown in FIG. 4 or FIG. 10A and FIG. 10B.

An embodiment further provides a computer program product. The computer program product includes instructions, and when the instructions are run on a computer, the computer is enabled to perform the method performed by the first base station in the embodiment shown in FIG. 4 or FIG. 10A and FIG. 10B.

An embodiment further provides a computer program product. The computer program product includes instructions, and when the instructions are run on a computer, the computer is enabled to perform the method performed by the user equipment in the embodiment shown in FIG. 4 or FIG. 10A and FIG. 10B.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the embodiments, the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments may be integrated into one processing unit, or each of the units may exist alone physically, or two or more units may be integrated into one unit. The integrated unit may be implemented in a form of hardware or may be implemented in a form of a software function unit.

When the integrated unit is implemented in the form of the software functional unit and sold or used as an independent product, the integrated unit may be stored in a computer-readable storage medium. Based on such an understanding, the solutions essentially, or the part contributing to the conventional technology, or all or some of the solutions may be implemented in the form of a software product. The computer software product is stored in a storage medium and includes several instructions for instructing a computer device (which may be a personal computer, a server, or a network device) to perform all or some of the steps of the methods described in the embodiments. The storage medium includes any medium that can store program code, such as a USB flash drive, a removable hard disk, a read-only memory (ROM), a random access memory (RAM), a magnetic disk, or an optical disc.

The foregoing embodiments are merely intended to describe the solutions, but are limiting. Persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A data exchange method comprising:
receiving, by a first base station, a first measurement report sent by user equipment (UE), wherein the first measurement report comprises a neighboring cell physical cell identifier (PCI) of an intra-frequency neighboring cell;
determining, by the first base station based on the neighboring cell PCI, configuration information corresponding to the intra-frequency neighboring cell, wherein the configuration information indicates a first time-frequency domain position of a resource element (RE) carrying a target signal, and the target signal is a downlink signal sent to the UE by a base station to which the intra-frequency neighboring cell belongs;
sending, by the first base station, a first indication message to the UE based on the configuration information, wherein the first indication message is used to indicate the UE to set to skip performing data channel demodulation on the RE corresponding to the first time-frequency domain position, when receiving physical downlink shared channel (PDSCH) data;
receiving, by the first base station, a first setting complete message sent by the UE, wherein the first setting complete message is sent by the UE after the UE determines that setting is completed;
setting, by the first base station based on the configuration information, to forbid carrying, when delivering the PDSCH data to the UE, the PDSCH data on the RE corresponding to the first time-frequency domain position;
receiving, by the first base station, a second measurement report sent by the UE, wherein the second measurement report does not carry the neighboring cell PCI;
when the first base station determines that the second measurement report does not carry the neighboring cell PCI, sending, by the first base station, a second indication message to the UE based on the configuration information, wherein the second indication message is used to indicate the UE to set to resume, when receiving the PDSCH data, performing data channel demodulation on the RE corresponding to the first time-frequency domain position;
receiving, by the first base station, a second setting complete message sent by the UE, wherein the second setting complete message is sent by the UE after the UE determines that setting is completed; and
setting, by the first base station based on the configuration information, to resume carrying, when delivering the PDSCH data to the UE, the PDSCH data on the RE corresponding to the first time-frequency domain position.

2. The data exchange method according to claim 1, wherein the determining, by the first base station based on the neighboring cell PCI, the configuration information corresponding to the intra-frequency neighboring cell further comprises:
determining, by the first base station based on the neighboring cell PCI, that the base station to which the intra-frequency neighboring cell belongs is the first base station; and
determining, by the first base station based on a preset correspondence between the neighboring cell PCI and the configuration information, the configuration information corresponding to the intra-frequency neighboring cell.

3. The data exchange method according to claim 1, wherein the determining, by the first base station based on the neighboring cell PCI, the configuration information corresponding to the intra-frequency neighboring cell further comprises:
determining, by the first base station based on the neighboring cell PCI, that the base station to which the intra-frequency neighboring cell belongs is a second base station;
sending, by the first base station, a request for obtaining the configuration information to the second base station; and
receiving, by the first base station, the configuration information sent by the second base station.

4. The data exchange method according to claim 1, wherein the target signal is a channel state information reference signal (CSI-RS), and the configuration information is CSI-RS configuration information.

5. The data exchange method according to claim 4, wherein after the determining, by the first base station based on the neighboring cell PCI, the configuration information corresponding to the intra-frequency neighboring cell, and before the sending, by the first base station, a first indication message to the UE based on the configuration information, the method further comprises:

obtaining, by the first base station, zero-power CSI-RS configuration information based on the CSI-RS configuration information; and setting, by the first base station, to comprise the zero-power CSI-RS configuration information in the first indication message, wherein the zero-power CSI-RS configuration information is used to indicate the UE to skip, when receiving the PDSCH data, performing data channel demodulation on the RE corresponding to the first time-frequency domain position.

6. The data exchange method according to claim 1, wherein the first measurement report further comprises a first parameter and a second parameter, the first parameter indicates a signal strength that is of a serving cell and that is measured by the UE, and the second parameter indicates a signal strength that is of the intra-frequency neighboring cell and that is measured by the UE; and the sending, by the first base station, the first indication message to the UE based on the configuration information further comprises:

after the first base station determines that a difference between the first parameter and the second parameter in the first measurement report is less than or equal to a preset threshold, sending, by the first base station, the first indication message to the UE based on the configuration information.

7. A first base station, comprising:
a processor; and
a memory coupled to the processor, the memory comprising instructions that, when executed by the processor, cause the first base station to:
receive a first measurement report sent by user equipment (UE), wherein the first measurement report comprises a neighboring cell physical cell identifier (PCI) of an intra-frequency neighboring cell;
determine, based on the neighboring cell PCI, configuration information corresponding to the intra-frequency neighboring cell, wherein the configuration information indicates a first time-frequency domain position of a resource element (RE) carrying a target signal, and the target signal is a downlink signal sent to the UE by a base station to which the intra-frequency neighboring cell belongs;
send a first indication message to the UE based on the configuration information, wherein the first indication message is used to indicate the UE to set to skip performing data channel demodulation on the RE corresponding to the first time-frequency domain position when receiving physical downlink shared channel (PDSCH) data;
receive a first setting complete message sent by the UE, wherein the first setting complete message is sent by the UE after the UE determines that setting is completed; and
set, based on the configuration information, to forbid carrying, when delivering the PDSCH data to the UE, the PDSCH data on the RE corresponding to the first time-frequency domain position;
after the setting, based on the configuration information, to forbid carrying, when delivering the physical downlink shared channel PDSCH data to the UE, the PDSCH data on the RE corresponding to the first time-frequency domain position,
receive a second measurement report sent by the UE, wherein the second measurement report does not carry the neighboring cell PCI;

when determining that the second measurement report does not carry the neighboring cell PCI, send a second indication message to the UE based on the configuration information, wherein the second indication message is used to indicate the UE to set to resume, when receiving the PDSCH data, performing data channel demodulation on the RE corresponding to the first time-frequency domain position;
receive a second setting complete message sent by the UE, wherein the second setting complete message is sent by the UE after the UE determines that setting is completed; and
set based on the configuration information, to resume carrying, when delivering the PDSCH data to the UE, the PDSCH data on the RE corresponding to the first time-frequency domain position.

8. The first base station according to claim 7, wherein the instructions, when executed by the processor, further cause the first base station to:
determine, based on the neighboring cell PCI, that the base station to which the intra-frequency neighboring cell belongs is the first base station; and
determine, based on a preset correspondence between the neighboring cell PCI and the configuration information, the configuration information corresponding to the intra-frequency neighboring cell.

9. The first base station according to claim 7, wherein the instructions, when executed by the processor, further cause the first base station to:
determine, based on the neighboring cell PCI, that the base station to which the intra-frequency neighboring cell belongs is a second base station;
send, a request for obtaining the configuration information to the second base station; and
receive, the configuration information sent by the second base station.

10. The first base station according to claim 7, wherein the target signal is a channel state information reference signal (CSI-RS), and the configuration information is CSI-RS configuration information.

11. The first base station according to claim 10, wherein the instructions, when executed by the processor, further cause the first base station to:
after the determining, based on the neighboring cell PCI, configuration information corresponding to the intra-frequency neighboring cell, and before the sending, a first indication message to the UE based on the configuration information,
obtain zero-power CSI-RS configuration information based on the CSI-RS configuration information; and
set to comprise the zero-power CSI-RS configuration information in the first indication message, wherein the zero-power CSI-RS configuration information is used to indicate the UE to skip, when receiving the PDSCH data, performing data channel demodulation on the RE corresponding to the first time-frequency domain position.

12. User equipment (UE), comprising:
a processor; and
a memory coupled to the processor, the memory comprising instructions that, when executed by the processor, cause the user equipment to:
send a first measurement report to a first base station, wherein the first measurement report comprises a physical cell identifier (PCI) of an intra-frequency neighboring cell, the neighboring cell PCI is used to indicate the first base station to determine configuration information corresponding to the intra-frequency neighboring cell, the configuration information indicates a first time-frequency domain position of a resource element (RE) carrying a target signal, and the target signal is a downlink signal sent to the UE by a base station to which the intra-frequency neighboring cell belongs;

receive a first indication message sent by the first base station based on the configuration information; and set, based on the first indication message, to skip performing data channel demodulation on the RE corresponding to the first time-frequency domain position, when receiving physical downlink shared channel (PDSCH) data;

send a first setting complete message to the first base station after determining that setting is completed;

after the setting based on the first indication message, to skip, after receiving physical downlink shared channel PDSCH data sent by the first base station, performing data channel demodulation on the RE corresponding to the first time-frequency domain position, send a second measurement report to the first base station, wherein the second measurement report does not comprise the neighboring cell PCI of the intra-frequency neighboring cell;

receive a second indication message sent by the first base station based on the configuration information, wherein the second indication message is sent by the first base station when the first base station determines that the second measurement report does not comprise the neighboring cell PCI of the intra-frequency neighboring cell;

set based on the second indication message, to resume, when receiving the PDSCH data, performing data channel demodulation on the RE corresponding to the first time-frequency domain position; and send a second setting complete message to the first base station after determining that setting is completed.

13. The user equipment according to claim 12, wherein the target signal is a channel state information reference signal (CSI-RS), and the configuration information is CSI-RS configuration information.

14. The user equipment according to claim 13, wherein the first indication message comprises zero-power CSI-RS configuration information, and the zero-power CSI-RS configuration information is obtained by the first base station based on the CSI-RS configuration information; and the setting to skip, after receiving PDSCH data sent by the first base station, performing data channel demodulation on the RE corresponding to the first time-frequency domain position comprises:

setting based on the zero-power CSI-RS configuration information, to skip, after receiving the PDSCH data sent by the first base station, performing data channel demodulation on the RE corresponding to the first time-frequency domain position.

15. The user equipment according to claim 12, wherein the first measurement report further comprises a first parameter and a second parameter, the first parameter indicates a signal strength that is of a serving cell and that is measured by the UE, and the second parameter indicates a signal strength that is of the intra-frequency neighboring cell and that is measured by the UE; and the receiving a first indication message sent by the first base station comprises:

receiving the first indication message sent by the first base station based on the configuration information, wherein the first indication message is sent by the first base station when the first base station determines that a difference between the first parameter and the second parameter is less than or equal to a preset threshold.

16. The user equipment according to claim 15, wherein the instructions, when executed by the processor, cause the user equipment to:

after the receiving a first indication message sent by the first base station, send a second measurement report to the first base station;

receive a second indication message sent by the first base station, wherein the second indication message is sent by the first base station when the first base station determines that the second measurement report does not comprise the second parameter, or that the difference that is between the first parameter and the second parameter and that is comprised in the second measurement report is greater than the preset threshold;

set based on the second indication message, to resume, when receiving the PDSCH data, performing data channel demodulation on the RE corresponding to the first time-frequency domain position; and send a second setting complete message to the first base station after determining that setting is completed.

17. The user equipment according to claim 15, wherein the first parameter is a first reference signal received power (RSRP), and the second parameter is a second RSRP.

* * * * *